(12) United States Patent
Diederichs et al.

(10) Patent No.: US 11,940,539 B2
(45) Date of Patent: Mar. 26, 2024

(54) CAMERA-TO-LIDAR CALIBRATION AND VALIDATION

(71) Applicant: Motional AD LLC, Boston, MA (US)

(72) Inventors: Paul Aurel Diederichs, Graefelfing (DE); Maurilio Di Cicco, Singapore (SG); Jun Shern Chan, Singapore (SG); Andreas Jianhao Aumiller, Singapore (SG); Francisco Alejandro Suarez Ruiz, Singapore (SG)

(73) Assignee: Motional AD LLC, Boston, MA (US)

( * ) Notice: Subject to any disclaimer, the term of this patent is extended or adjusted under 35 U.S.C. 154(b) by 451 days.

(21) Appl. No.: 17/124,468

(22) Filed: Dec. 16, 2020

(65) Prior Publication Data

US 2021/0192788 A1 Jun. 24, 2021

Related U.S. Application Data

(60) Provisional application No. 62/950,076, filed on Dec. 18, 2019.

(51) Int. Cl.
*G01S 17/931* (2020.01)
*G01S 7/497* (2006.01)
(Continued)

(52) U.S. Cl.
CPC ............ *G01S 17/931* (2020.01); *G01S 7/497* (2013.01); *G01S 17/89* (2013.01); *G06F 18/22* (2023.01);
(Continued)

(58) Field of Classification Search
CPC ........ G01S 17/931; G01S 7/497; G01S 17/89; G01S 7/4808; G01S 17/86; G01S 7/48;
(Continued)

(56) References Cited

U.S. PATENT DOCUMENTS

| 9,719,801 | B1 | 8/2017 | Ferguson et al. |
| 9,734,419 | B1 * | 8/2017 | Ye .............................. G06T 7/85 |

(Continued)

FOREIGN PATENT DOCUMENTS

| CN | 105551039 | 5/2016 |
| CN | 106228537 | 12/2016 |

(Continued)

OTHER PUBLICATIONS

Opromolla et al., "Laboratory test of pose determination algorithm for uncooperative spacecraft," 2017 IEEE International Workshop on Metrology for AeroSpace (MetroAeroSpace), Jun. 21, 2017, 169-174.

(Continued)

*Primary Examiner* — Mahendra R Patel
(74) *Attorney, Agent, or Firm* — Fish & Richardson P.C.

(57) ABSTRACT

An automatic calibration and validation pipeline is disclosed to estimate and evaluate the accuracy of extrinsic parameters of a camera-to-LiDAR coordinate transformation. In an embodiment, an automated and unsupervised calibration procedure is employed where the computed rotational and translational parameters ("extrinsic parameters") of the camera-to-LiDAR coordinate transformation are automatically estimated and validated, and upper bounds on the accuracy of the extrinsic parameters are set. The calibration procedure combines three-dimensional (3D) plane, vector and point correspondences to determine the extrinsic parameters, and the resulting coordinate transformation is validated by analyzing the projection of a filtered point cloud including a validation target in the image space. A single camera image and LiDAR scan (a "single shot") are used to calibrate and validate the extrinsic parameters. In addition to only requiring a single shot, the complete procedure solely relies on one (Continued)

or more planar calibration targets and simple geometrical validation targets.

21 Claims, 23 Drawing Sheets

(51) Int. Cl.

| | | |
|---|---|---|
| *G01S 17/89* | (2020.01) | |
| *G06F 18/22* | (2023.01) | |
| *G06F 18/23* | (2023.01) | |
| *G06T 7/80* | (2017.01) | |
| *G06V 10/762* | (2022.01) | |
| *G06V 20/56* | (2022.01) | |

(52) U.S. Cl.
CPC .............. *G06F 18/23* (2023.01); *G06T 7/80* (2017.01); *G06V 10/7635* (2022.01); *G06T 2207/10028* (2013.01); *G06T 2207/30252* (2013.01); *G06V 20/56* (2022.01)

(58) Field of Classification Search
CPC ........ G06F 18/22; G06F 18/23; G06F 18/251; G06F 18/2323; G06F 18/241; G06T 7/80; G06T 2207/10028; G06T 2207/30252; G06T 2207/30244; G06T 2207/30248; G06V 10/7635; G06V 20/56; G06V 10/44; B60W 60/00; H04N 7/18; H04N 23/57
USPC ......................................................... 382/103
See application file for complete search history.

(56) References Cited

U.S. PATENT DOCUMENTS

| | | | |
|---|---|---|---|
| 10,269,141 B1 * | 4/2019 | Shotan | H04N 25/61 |
| 10,726,579 B1 * | 7/2020 | Huang | G01S 7/4972 |
| 10,838,049 B1 * | 11/2020 | Schwiesow | G01S 7/4972 |
| 10,937,178 B1 * | 3/2021 | Srinivasan | G06T 7/521 |
| 11,443,524 B2 | 9/2022 | Aguiar et al. | |
| 11,609,574 B2 * | 3/2023 | Walters | G05D 1/0225 |
| 2002/0072869 A1 | 6/2002 | Stiller | |
| 2010/0157280 A1 * | 6/2010 | Kusevic | G01S 7/4972 |
| | | | 356/4.01 |
| 2011/0157373 A1 * | 6/2011 | Ye | G06T 7/85 |
| | | | 348/187 |
| 2014/0333729 A1 | 11/2014 | Pflug | |
| 2016/0129917 A1 | 5/2016 | Gariepy et al. | |
| 2017/0008521 A1 * | 1/2017 | Braunstein | G05D 1/0219 |
| 2017/0261600 A1 | 9/2017 | Maennicke et al. | |
| 2017/0287166 A1 * | 10/2017 | Claveau | G06T 7/80 |
| 2018/0086284 A1 | 3/2018 | Gupta et al. | |
| 2018/0180723 A1 * | 6/2018 | Sebastian | G01S 7/497 |
| 2018/0196127 A1 | 7/2018 | Harada | |
| 2018/0232947 A1 * | 8/2018 | Nehmadi | G01S 7/295 |
| 2018/0299534 A1 | 10/2018 | LaChapelle et al. | |
| 2018/0356526 A1 * | 12/2018 | Wang | G06V 10/143 |
| 2019/0012808 A1 | 1/2019 | Mou | |
| 2019/0052851 A1 | 2/2019 | Korl et al. | |
| 2019/0065863 A1 | 2/2019 | Luo et al. | |
| 2019/0116354 A1 | 4/2019 | Yao et al. | |
| 2019/0204425 A1 | 7/2019 | Abari et al. | |
| 2019/0265712 A1 | 8/2019 | Satzoda et al. | |
| 2019/0293772 A1 | 9/2019 | Pfeiffer et al. | |
| 2019/0329782 A1 | 10/2019 | Shalev-Shwartz et al. | |
| 2019/0339687 A1 * | 11/2019 | Cella | G06N 3/045 |
| 2020/0005489 A1 | 1/2020 | Kroeger et al. | |
| 2020/0150677 A1 * | 5/2020 | Walters | B63H 25/04 |
| 2020/0174107 A1 * | 6/2020 | Briggs | H04N 23/90 |
| 2020/0184236 A1 | 6/2020 | Aguiar | |
| 2020/0193643 A1 * | 6/2020 | Hess | G06V 10/44 |
| 2020/0226794 A1 | 7/2020 | Sugio et al. | |
| 2020/0282929 A1 * | 9/2020 | Kroeger | G01S 7/497 |
| 2021/0056306 A1 * | 2/2021 | Hu | G06V 20/59 |
| 2021/0056713 A1 * | 2/2021 | Rangesh | G01S 17/66 |

FOREIGN PATENT DOCUMENTS

| | | | | |
|---|---|---|---|---|
| CN | 107167826 A | * | 9/2017 | ............ G01C 21/30 |
| CN | 109300162 | | 2/2019 | |
| CN | 109636837 | | 4/2019 | |
| CN | 109754426 | | 5/2019 | |
| CN | 109813335 | | 5/2019 | |
| CN | 109949371 | | 6/2019 | |
| CN | 110175576 A | * | 8/2019 | ........... G01S 17/023 |
| CN | 110298891 | | 10/2019 | |
| DE | 102017205727 | | 10/2018 | |
| EP | 3109667 | | 12/2016 | |
| EP | 3109667 B1 | * | 3/2018 | ........... G01S 13/931 |
| EP | 3158293 B1 | * | 1/2019 | ........... B64C 39/024 |
| EP | 3438776 | | 2/2019 | |
| EP | 3438777 | | 2/2019 | |
| EP | 3637142 A1 | * | 4/2020 | ............ G01C 21/32 |
| EP | 3815045 | | 5/2021 | |
| GB | 201219850 | | 12/2012 | |
| WO | WO 2016153224 | | 9/2016 | |
| WO | WO 2018138584 | | 8/2018 | |
| WO | WO-2018138584 A1 | * | 8/2018 | ............ G01S 17/48 |
| WO | WO 2018184829 | | 10/2018 | |
| WO | WO 2018196001 | | 11/2018 | |
| WO | WO-2019018315 A1 | * | 1/2019 | ........... G01C 21/165 |
| WO | WO 2019079211 | | 4/2019 | |
| WO | WO-2019136479 A1 | * | 7/2019 | ........ B60W 30/0956 |
| WO | WO 2020006378 | | 1/2020 | |

OTHER PUBLICATIONS

SAE, "Surface Vehicle Recommended Practice", SAE International's standard J3016: Taxonomy and Definitions for Terms Related to On-Road Motor Vehicle Automated Driving Systems, 30 pages, Sep. 2016.

Iyer et al., "CalibNet: Self-Supervised Extrinsic Calibration using 3D Spatial Transformer Networks," submitted on Mar. 22, 2018, arXiv:1803.08181, 8 pages.

Levinson et al., "Automatic Online Calibration of Cameras and Lasers," Robotics: Science and Systems, Jun. 24, 2013, 2(7), 8 pages.

Verma et al., "Automatic Extrinsic Calibration Between a Camera and a 3D Lidar using 3D Point and Plane Correspondences," CoRR, Submitted on Apr. 29, 2019, arXiv:1904.12433v1, 7 pages.

Xue et al., "Target object size and orientation recognition based on 3D point cloud Euclidean clustering and RANSAC boundary fitting," Mechanical Design and Research, 2018, 34(5)44-48+53 (Abstract with English translation).

Zhou et al., "A New Minimal Solution for the Extrinsic Calibration of a 2D LIDAR and a Camera Using Three Plane-Line Correspondences," IEEE Sensors Journal, Feb. 2014, 14(2):442-454.

* cited by examiner

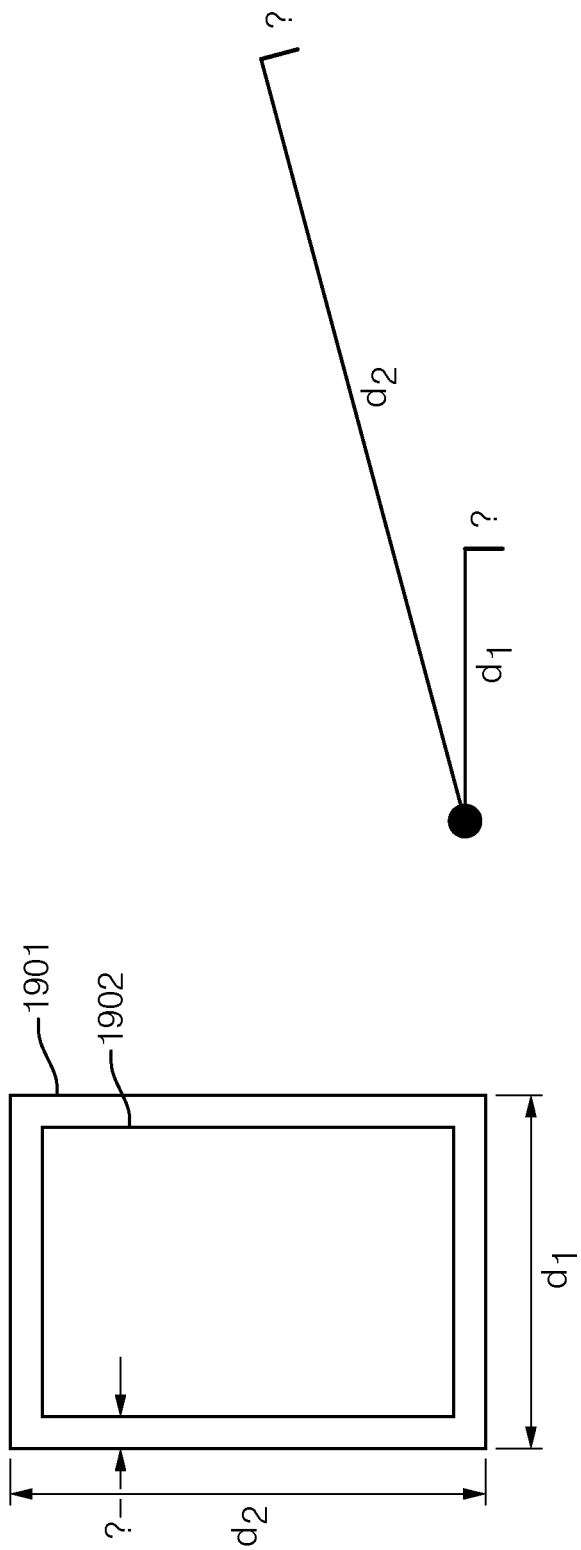
FIG. 19A
FIG. 19B
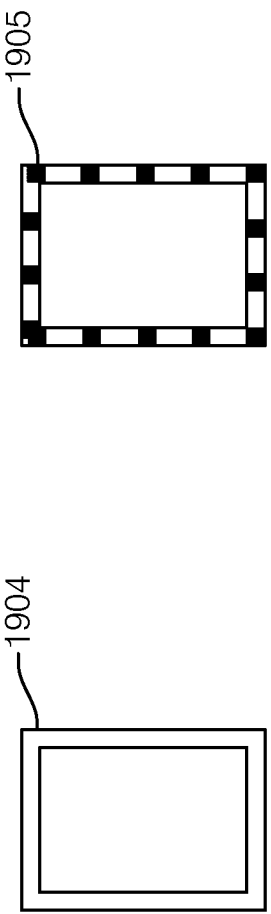
FIG. 20A
FIG. 20B
FIG. 20C
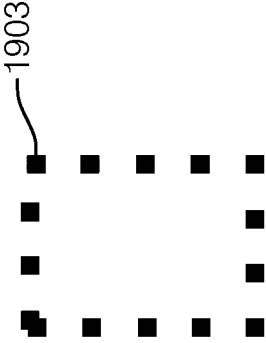

CAMERA-TO-LIDAR CALIBRATION AND VALIDATION

RELATED APPLICATION

This disclosure claims priority to U.S. Provisional Patent Application Ser. No. 62/950,076, entitled "CAMERA-TO-LIDAR CALIBRATION AND VALIDATION" and filed on Dec. 18, 2019, the entire contents of which are incorporated herein by reference.

TECHNICAL FIELD

This description relates generally to the operation of vehicles and specifically to camera-to-LiDAR calibration and validation.

BACKGROUND

Many robotic tasks rely on sensor fusion to overcome the shortcomings of each individual sensor. Autonomous vehicles, for example, operate by fusing complementary sensory information obtained from the on-board sensors. The dense two-dimensional color, appearance and texture information perceived by the vehicle's cameras is associated with the sparse three-dimensional depth and structure information provided by the vehicle's light detection and ranging systems (LiDARs) within the perception pipeline. This enables autonomous vehicles to generate a deeper understanding of the surrounding environment.

The fusion of multimodal sensor data requires that all sensor information is expressed with respect to a common coordinate system. Therefore, the exact pose (orientation and translation) of each sensor mounted to a robotic platform needs to be computed. Variances in the manufacturing of sensor mounts typically means that an exact sensor pose cannot be inferred from schematic plans. Additionally, a sensor suite may need to be re-calibrated, as the extrinsic calibration values may drift over time due to shifts in the sensors' poses caused by jerky movements.

Research in this field has yielded numerous solutions, which estimate the extrinsic parameters precisely. Many of the proposed solutions, however, still require manual intervention, are supervised and therefore do not scale well to a commercial platform. Additionally, the proposed solutions fail to address the challenge of evaluating the accuracy of the estimated rigid body transformation. For sensor fusion to prove effective, the extrinsic calibration must be extremely accurate. Small deviations in the extrinsic parameters can have adverse effects on the fusion. Consequently, bounds on the accuracy for safety critical tasks, such as autonomous driving, must be guaranteed and maintained.

SUMMARY

Techniques are provided for automatic and unsupervised calibration and validation of extrinsic parameters of a camera-to-LiDAR transformation using a single camera image and LiDAR scan (hereinafter also referred to as "single shot"). In an embodiment, an automatic calibration and validation pipeline estimates and evaluates the accuracy of the rotational and translation elements ("extrinsic parameters"). The calibration procedure combines three-dimensional (3D) plane, vector and point correspondences to estimate the extrinsic parameters of a camera-to-LiDAR coordinate transformation.

Techniques are also provided for validating the calibration using simple validation targets whose shape share similarities with a picture frame. The accuracy of a calibration is evaluated qualitatively by projecting the LiDAR points onto the camera image and observing mutual features of validation targets, captured by both sensors, all across the camera's field of view. A calibration is classified as acceptable if the LiDAR points corresponding to a specific common validation target come to rest on the validation target in the camera image.

In an embodiment, a method comprises: receiving, from a light detection and ranging (LiDAR) sensor of a vehicle, a first point cloud including a first set of LiDAR points returned from one or more calibration targets; receiving, from a camera sensor of the vehicle, a first camera image including the one or more calibration targets; extracting, using one or more processors of the vehicle, features of the one or more calibration targets from the first set of LiDAR points and the first camera image; associating, using the one or more processors, the extracted features from the first set of LiDAR points and the first camera image to determine matching features; estimating, using the one or more processors, extrinsic parameters of a coordinate transformation from LiDAR coordinates to camera coordinates or from camera coordinates to LiDAR coordinates, based at least in part on the matching features; receiving, from the LiDAR sensor, a second point cloud including a second set of LiDAR points returned from one or more validation targets; receiving, from the camera sensor, a second camera image including the one or more validation targets; using the coordinate transformation to project the second set of LiDAR points onto the one or more validation targets in the second camera image; estimating, using the one or more processors, one or more upper bounds on the accuracy of the estimated extrinsic parameters; determining, using the one or more processors, whether a specified number or percentage of LiDAR points in the second set of LiDAR points lie on or within the one or more validation targets included in the second camera image in accordance with the computed one or more upper bounds on accuracy; and in accordance with the specified number or percentage of LiDAR points from the second set of LiDAR points lying on or within the one or more validation targets in the second camera image within the upper bound on accuracy, deeming the estimated extrinsic parameters of the coordinate transformation valid.

In an embodiment, the extracted features include vector quantities defining a plane of the one or more calibration targets, and the extrinsic parameters are estimated by aligning the vector quantities in LiDAR coordinates with their counterpart vector quantities in camera coordinates, and wherein the vector quantities match when the vector quantities correspond within defined constraints on rotation and translation of the vector quantities.

In an embodiment, estimating one or more upper bounds on accuracy accounts for uncertainty associated with manually measured translation parameters and the dimensions and locations of the one or more validation targets.

In an embodiment, two validation targets are used and a first validation target is a first distance from the camera and a second validation target is a second distance from the camera that is farther than the first distance, and the first validation target is used to estimate a first upper bound on accuracy for estimated translation parameters included in the estimated extrinsic parameters, and the second validation target is used to estimate a second upper bound on the estimated rotational parameters included in the estimated extrinsic parameters.

In an embodiment, an upper bound on an estimated roll angle of the estimated extrinsic parameters is derived from a length and thickness of a larger of the two validation targets.

In an embodiment, extracting, using one or more processors of the vehicle, features of the one or more calibration targets from the first set of LiDAR points, further comprises: clustering the first set of LiDAR points into spatial clusters of LiDAR points; for each cluster: filter the LiDAR points within the cluster to detect outlier LiDAR points; refine the cluster by removing any detected outlier LiDAR points from the cluster; filter the cluster by its convex hull, where the convex hull forms a rectangle of known dimensions; detect edge points in the cluster; project the edge points onto a plane of the cluster; fit a two-dimensional (2D) rectangle to the edge points; determine whether the fitted 2D rectangle defines a calibration target by formulating and solving a constraint optimization problem, which incorporates priors on the 2D rectangle's geometrical shape and dimensions; and in accordance with the fitted 2D rectangle defining a calibration target, deriving a plane vector, boundary vectors and a centroid of the 2D rectangle as the features of the calibration target.

In an embodiment, detecting edge points in the cluster includes filtering the point cloud for points exhibiting a depth continuity greater than a threshold value, identifying filtered points on a beam that have depth values that are lower than at least one of two nearest neighbor LiDAR points on the same beam, computing an intersection between the detected edge points, and linking each edge point to the cluster containing the edge point.

In an embodiment, extracting, using one or more processors of the vehicle, features of the one or more calibration targets from the first image, further comprises: detecting, using a computer vision process, the one or more calibration targets in the first image; extracting three calibration target vectors from the detected calibration targets by solving a perspective-n-point (PnP) problem for each calibration target, where the solution to the PnP problem between global and pixel coordinates of each corner of each calibration target is a transformation from camera coordinates to calibration target coordinates, which transforms the corner from the calibration target coordinate system to the camera's coordinate system, and where the column vectors of the transformation equate to the three calibration target vectors with respect to the camera coordinate system, wherein each centroid of a calibration target is derived by expressing all of the corner points of each calibration target with respect to the camera coordinate system, and wherein the centroid equates to an average pose of all of the corners in the camera coordinate system.

In an embodiment, the point cloud is filtered for points exhibiting a depth continuity greater than a threshold value.

In an embodiment, the one or more calibration targets are planar checkerboards.

In an embodiment, a system or apparatus comprises: one or more processors, and memory storing instructions that when executed by the one or more processors, cause the one or more processors to perform any one of the methods described above.

In an embodiment, a non-transitory, computer-readable medium stores instructions that when executed by the one or more processors, cause the one or more processors to perform any one of the methods described above.

One or more of the disclosed embodiments provide one or more of the following advantages. A single shot is used to calibrate and validate the accuracy of a camera-to-LiDAR coordinate transformation within an upper bound on accuracy that accounts for translation and rotation error. In addition to only requiring a single shot, the complete procedure solely relies on one or more planar calibration targets (e.g., checkerboards) and one or more simple geometrical validation targets (e.g., rectangular target frames). The disclosed embodiments are scalable to commercial applications such as autonomous vehicles for which high calibration standards must be ensured and maintained.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 19A illustrates frame dimensions used in a validation procedure, in accordance with one or more embodiments.

FIG. 19B illustrates frame placement used in a validation procedure, in accordance with one or more embodiments.

FIG. 20A illustrates LiDAR points corresponding to the frame of FIG. 20, in accordance with one or more embodiments.

FIG. 20B illustrates the image of the frame as observed by the camera, in accordance with one or more embodiments.

FIG. 20C illustrates a projection of the LiDAR points onto the camera image with acceptable extrinsic calibration parameters, in accordance with one or more embodiments.

DETAILED DESCRIPTION

Figure 1:
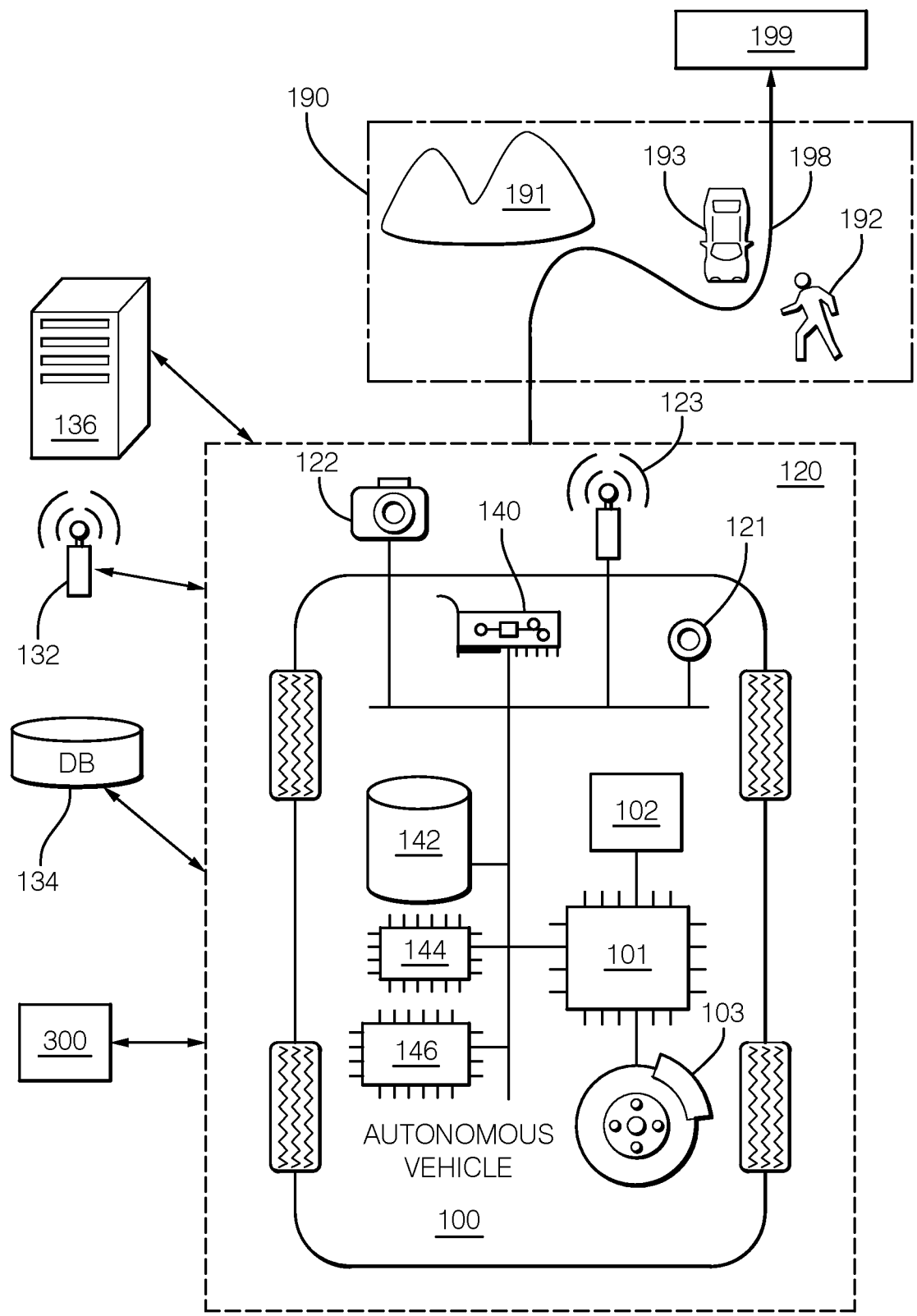
FIG. 1 shows an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Offline Camera-to-LiDAR Calibration
8. Offline Camera-to-LiDAR Validation

General Overview

The disclosed embodiments for camera-to-LiDAR calibration rely on at least one calibration target (e.g., a checkerboard) visible to both the camera and the LiDAR. The inputs for the calibration procedure include a single shot of the calibration target(s) from the camera and LiDAR, the camera's intrinsic parameters, the camera matrix and distortion coefficients, the number of visible calibration targets, the dimensions of the calibration targets and the spacing between the corners of the calibration targets. The disclosed embodiments automatically detect the plane spanned by each calibration target, the direction of the calibration target's boundary vectors and the calibration target's centroid in both the camera image and the LiDAR point cloud. The required information for the calibration is obtained for each calibration target in the camera image by solving a perspective-n-point (PnP) problem. In the LiDAR point cloud, a rectangle is fitted to each detected calibration target cluster, and the extrinsic parameters of the camera-to-LiDAR transformation are estimated by aligning identified features.

The disclosed embodiments for validating the calibration use a simple validation target, whose shape shares similarities with a picture frame. The accuracy of a calibration is evaluated qualitatively by projecting the LiDAR points containing the validation target onto the camera image using the camera-to-LiDAR coordinate transformation, and observing mutual features of the validation targets, captured by both sensors, across the camera's field of view. A calibration is classified as acceptable if the LiDAR points corresponding to a specific common validation target come to rest on the same validation target in the camera image.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are GNSS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
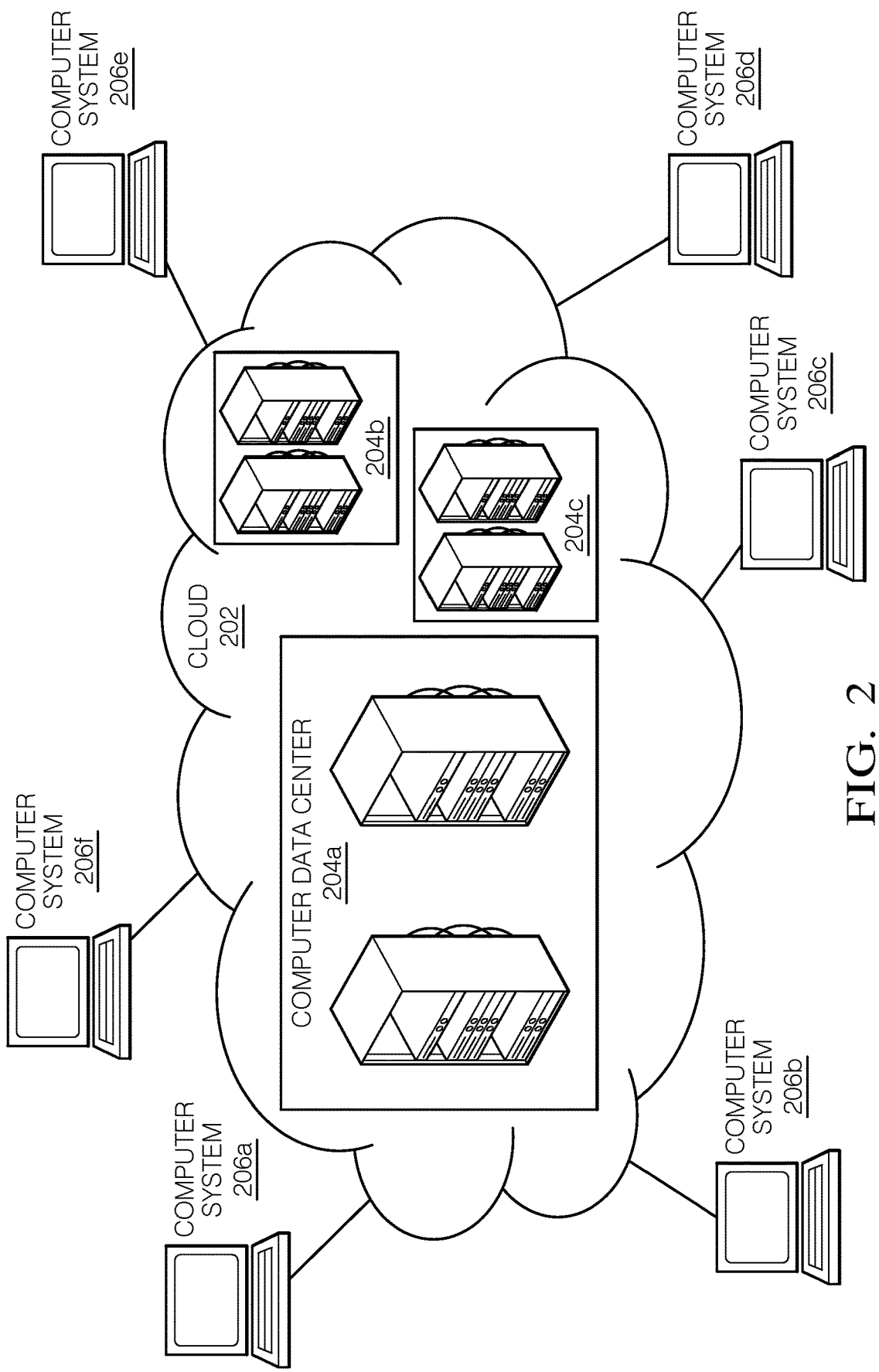
FIG. 2 illustrates an example "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
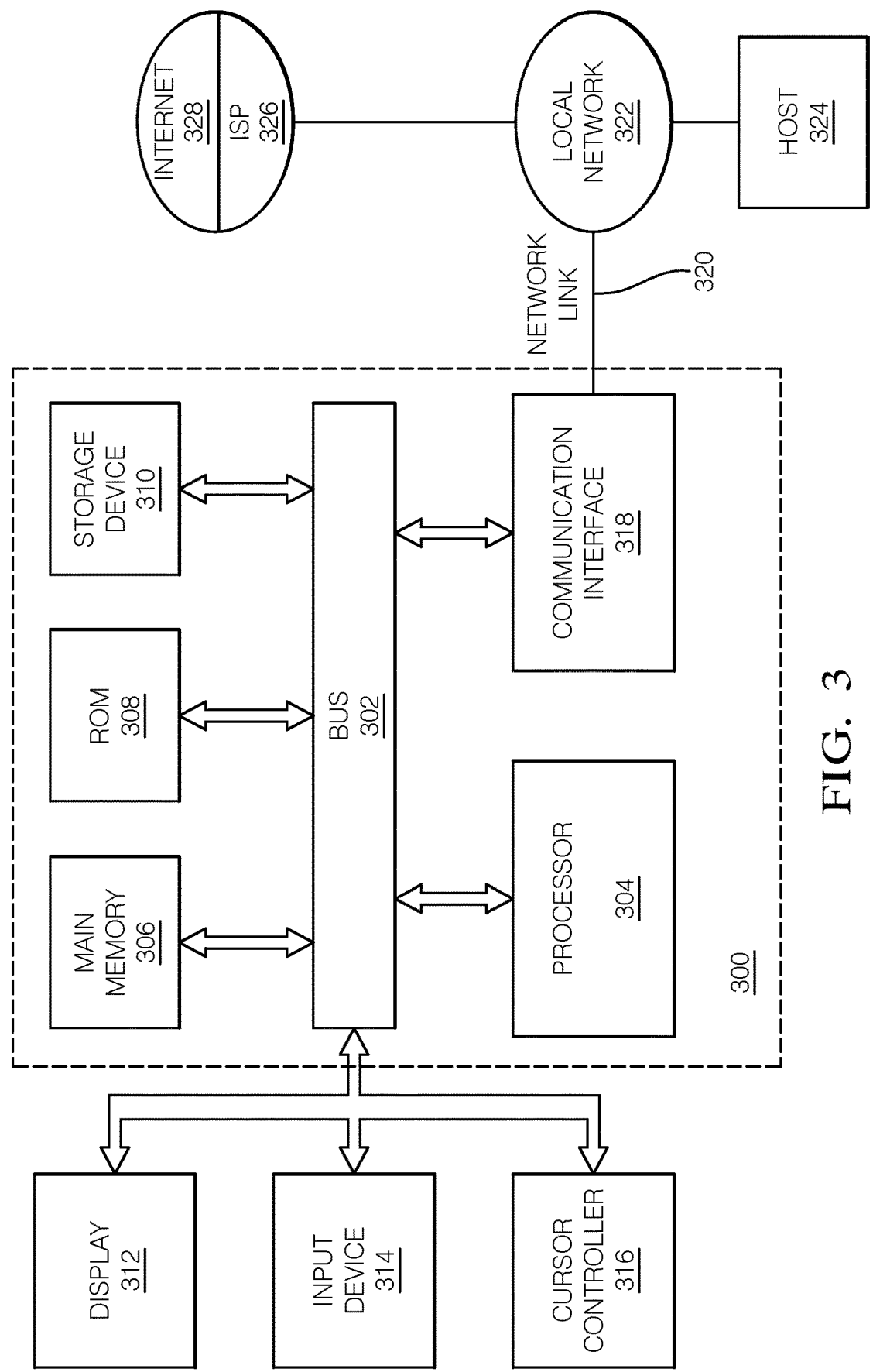
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310.

Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
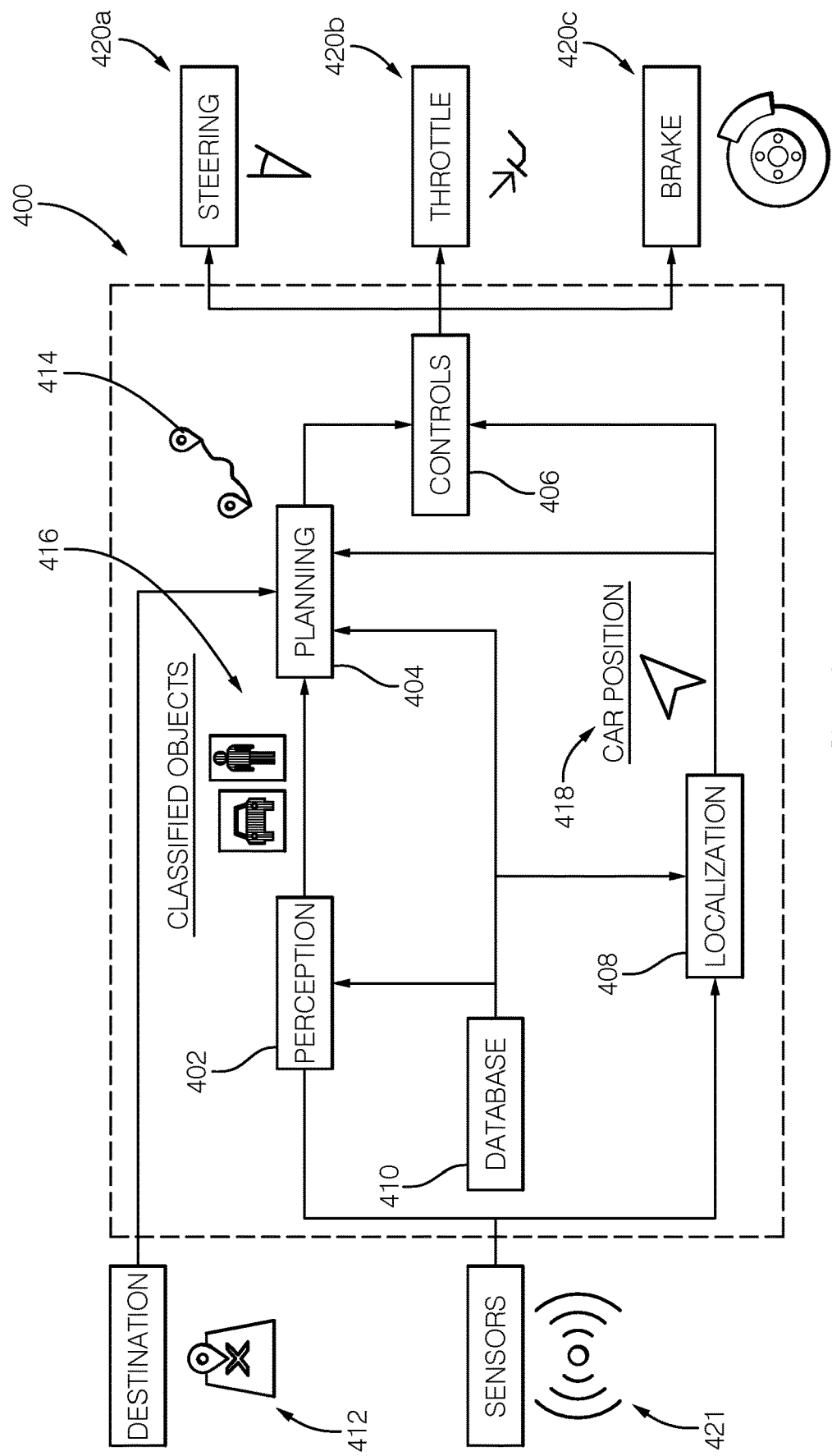
FIG. 4 shows an example architecture for an AV, in accordance with one or more embodiments.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Operation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
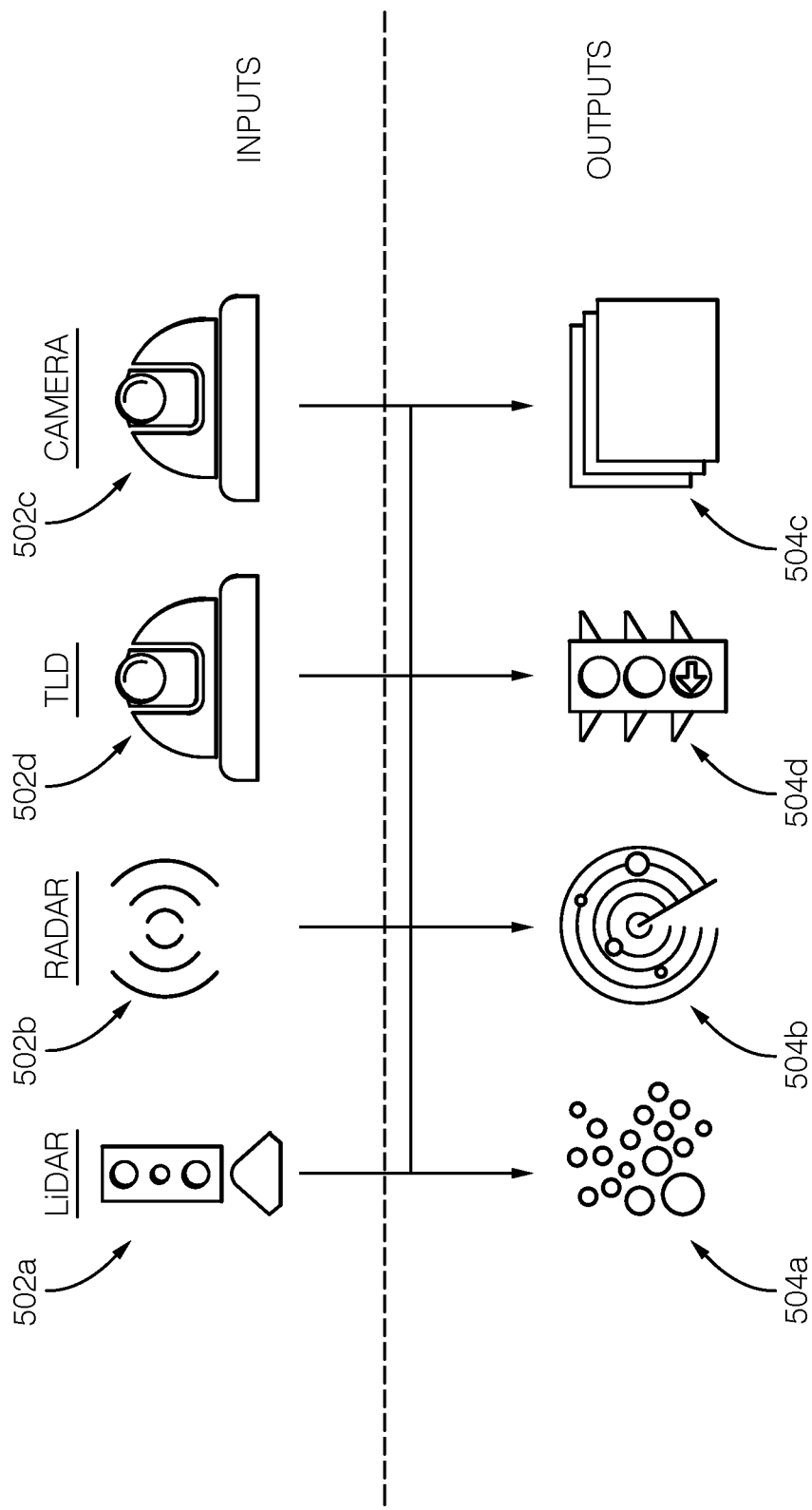
FIG. 5 shows an example of inputs and outputs that may be used by a perception module, in accordance with one or more embodiments.

FIG. 5 shows an example of inputs 502*a-d* (e.g., sensors 121 shown in FIG. 1) and outputs 504*a-d* (e.g., sensor data) that is used by the perception module 402 (FIG. 4). One input 502*a* is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504*a*. For example, LiDAR data is collections of 3D or 2D points (also known as a point clouds) that are used to construct a representation of the environment 190.

Another input 502*b* is a RADAR system. RADAR is a technology that uses radio waves to obtain data about nearby physical objects. RADARs can obtain data about objects not within the line of sight of a LiDAR system. A RADAR system 502*b* produces RADAR data as output 504*b*. For example, RADAR data are one or more radio frequency electromagnetic signals that are used to construct a representation of the environment 190.

Another input 502*c* is a camera system. A camera system uses one or more cameras (e.g., digital cameras using a light sensor such as a charge-coupled device [CCD]) to obtain information about nearby physical objects. A camera system produces camera data as output 504*c*. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502*d* is a traffic light detection (TLD) system. A TLD system uses one or more cameras to obtain information about traffic lights, street signs, and other physical objects that provide visual operation information. A TLD system produces TLD data as output 504*d*. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual operation information as possible, so that the AV 100 has access to all relevant operation information provided by these objects. For example, the viewing angle of the TLD system may be about 120 degrees or more.

In some embodiments, outputs 504*a-d* are combined using a sensor fusion technique. Thus, either the individual outputs 504*a-d* are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining using the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
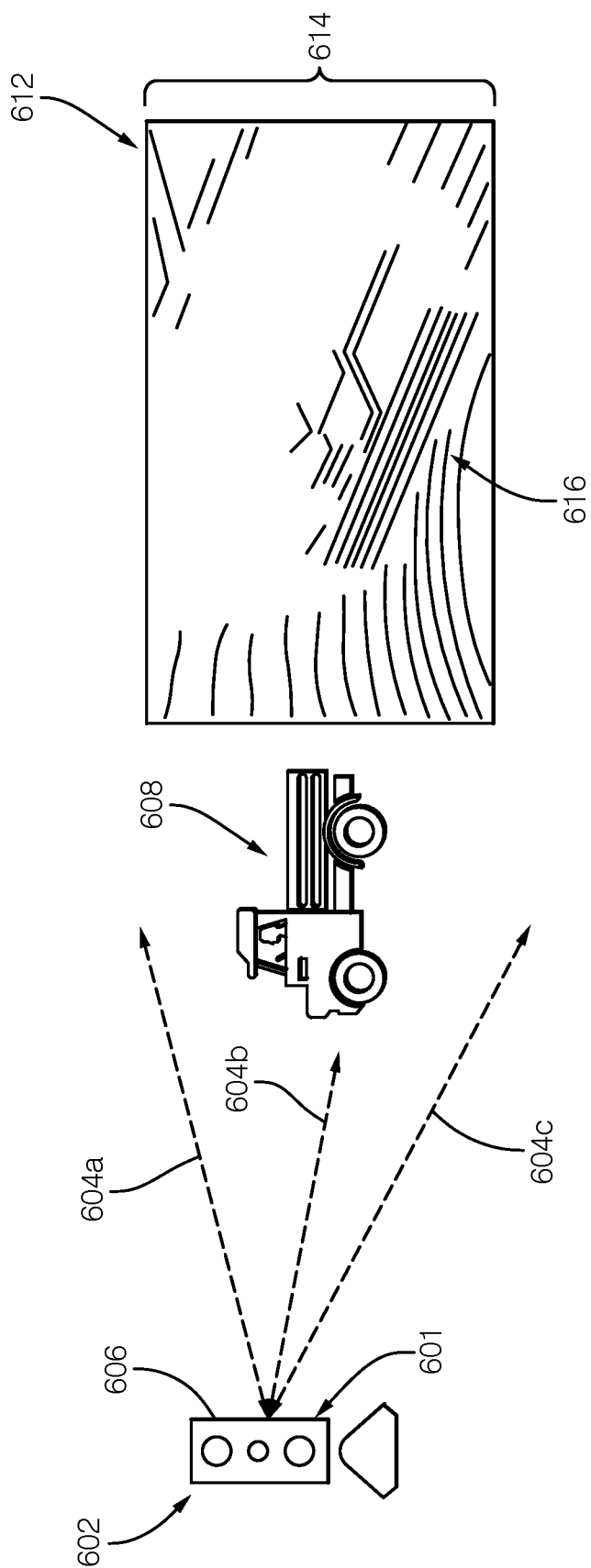
FIG. 6 shows an example of a LiDAR system, in accordance with one or more embodiments.

FIG. 6 shows an example of a LiDAR system 602 (e.g., the input 502*a* shown in FIG. 5). The LiDAR system 602 emits light 604*a-c* from a light emitter 606 (e.g., a laser transmitter). Light emitted by a LiDAR system is typically not in the visible spectrum; for example, infrared light is often used. Some of the light 604*b* emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
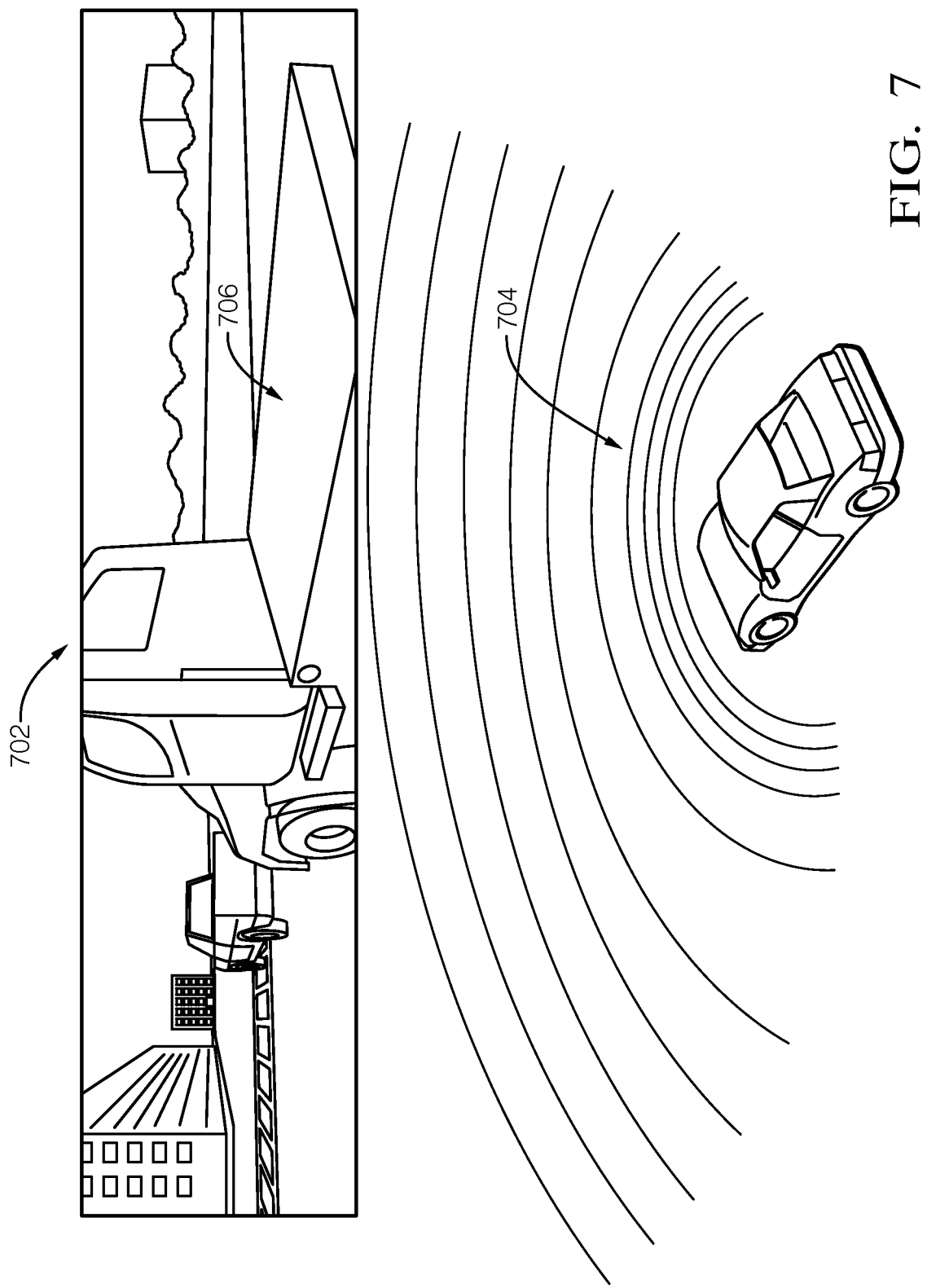
FIG. 7 shows the LiDAR system in operation, in accordance with one or more embodiments.

FIG. 7 shows the LiDAR system 602 in operation. In the scenario shown in this figure, the AV 100 receives both camera system output 504*c* in the form of an image 702 and LiDAR system output 504*a* in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
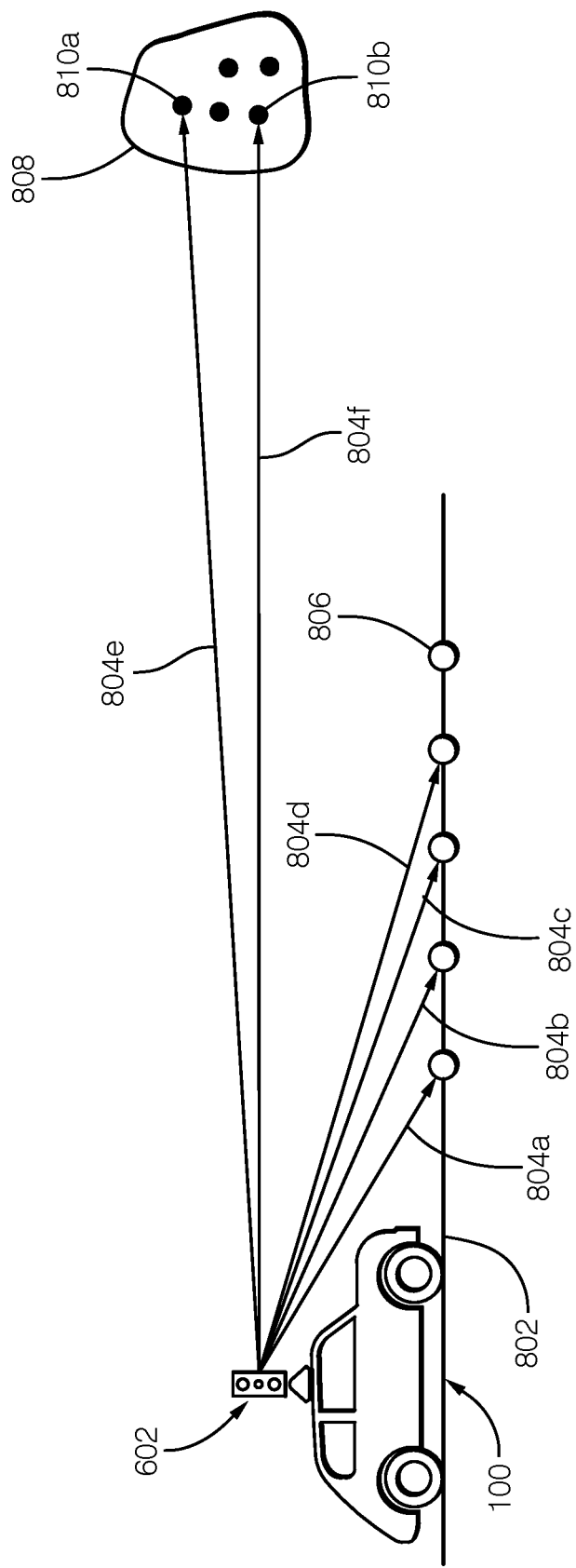
FIG. 8 shows the operation of the LiDAR system in additional detail, in accordance with one or more embodiments.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804*a-d* emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804*e-f* emitted by the LiDAR system 602 will be reflected from points 810*a-b* in a manner inconsistent with the expected consistent manner. From this information, the AV 100 can determine that the object 808 is present.

Path Planning

Figure 9:
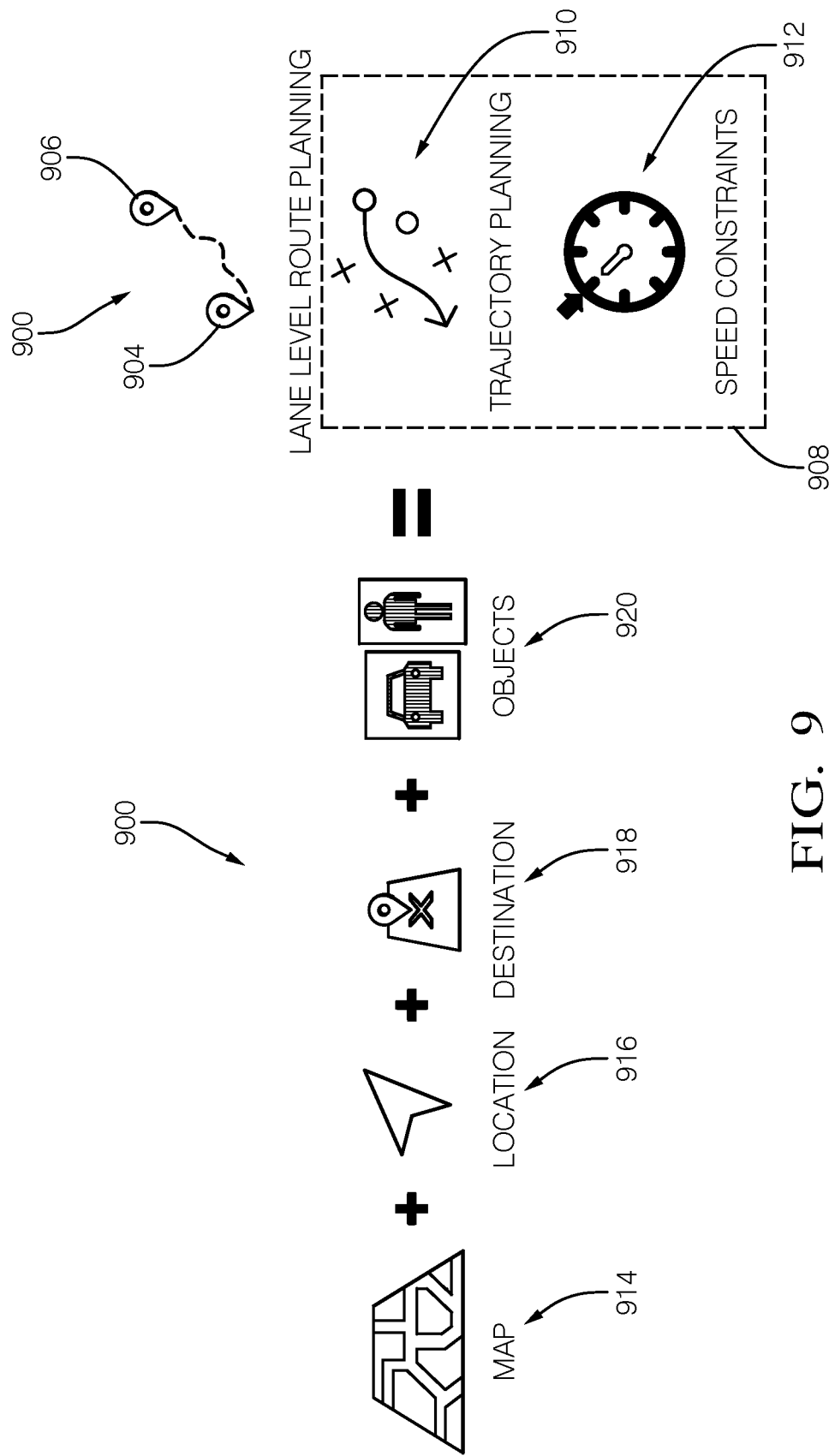
FIG. 9 shows a block diagram of the relationships between inputs and outputs of a planning module, in accordance with one or more embodiments.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
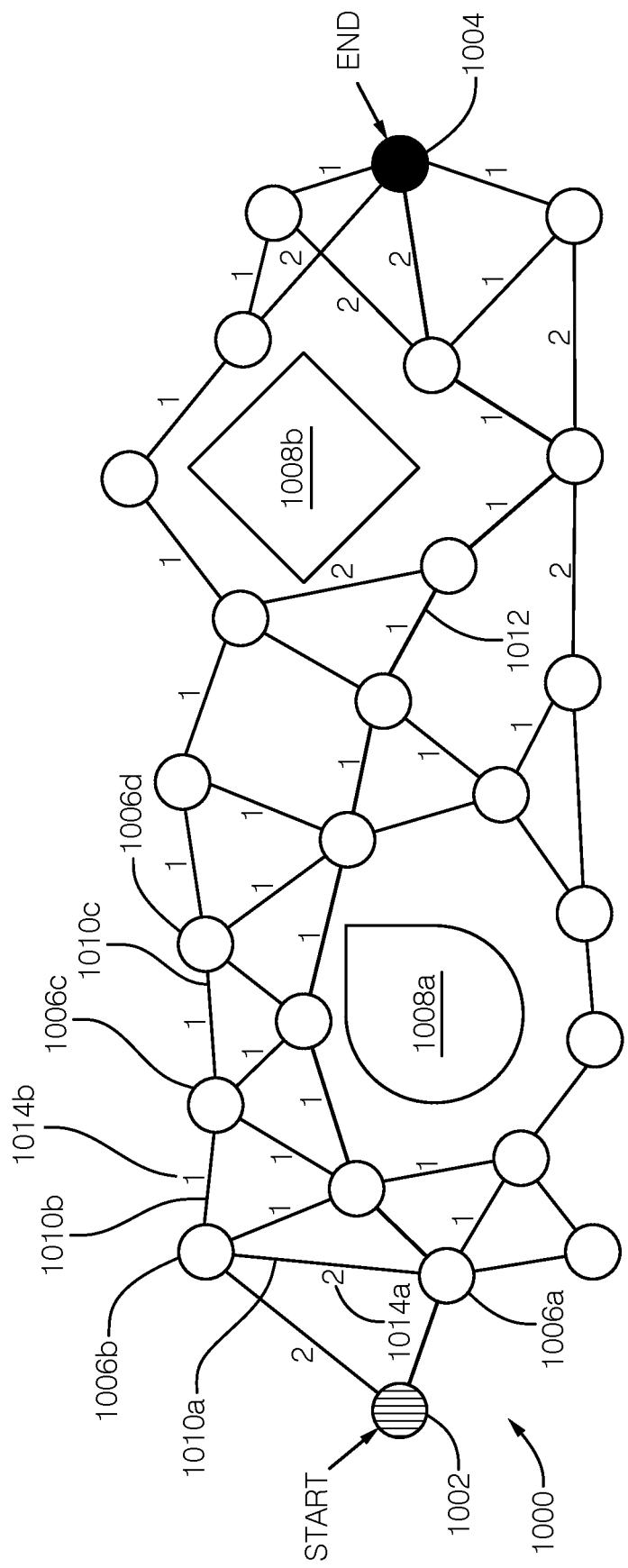
FIG. 10 shows a directed graph used in path planning, in accordance with one or more embodiments.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
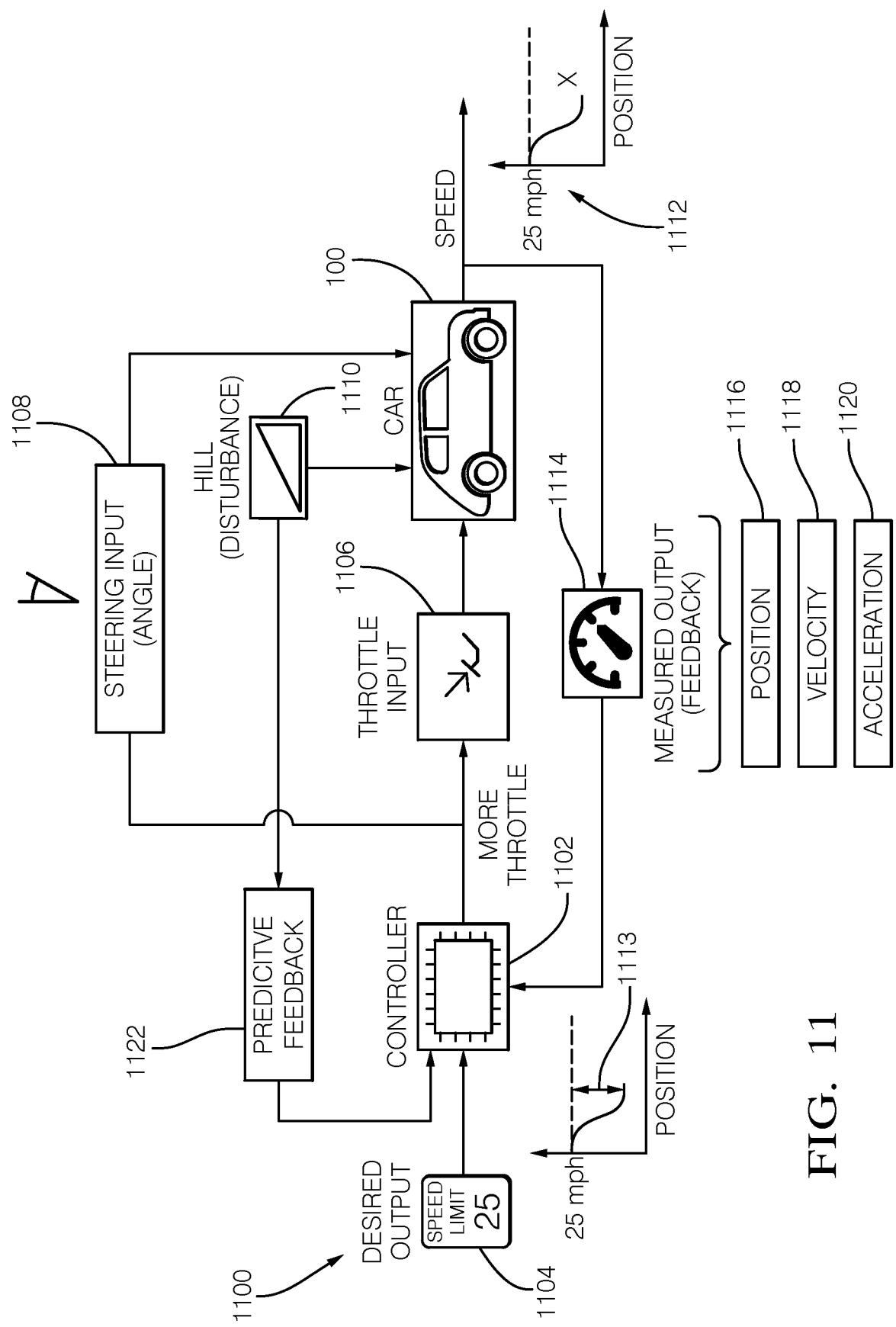
FIG. 11 shows a block diagram of the inputs and outputs of a control module, in accordance with one or more embodiments.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
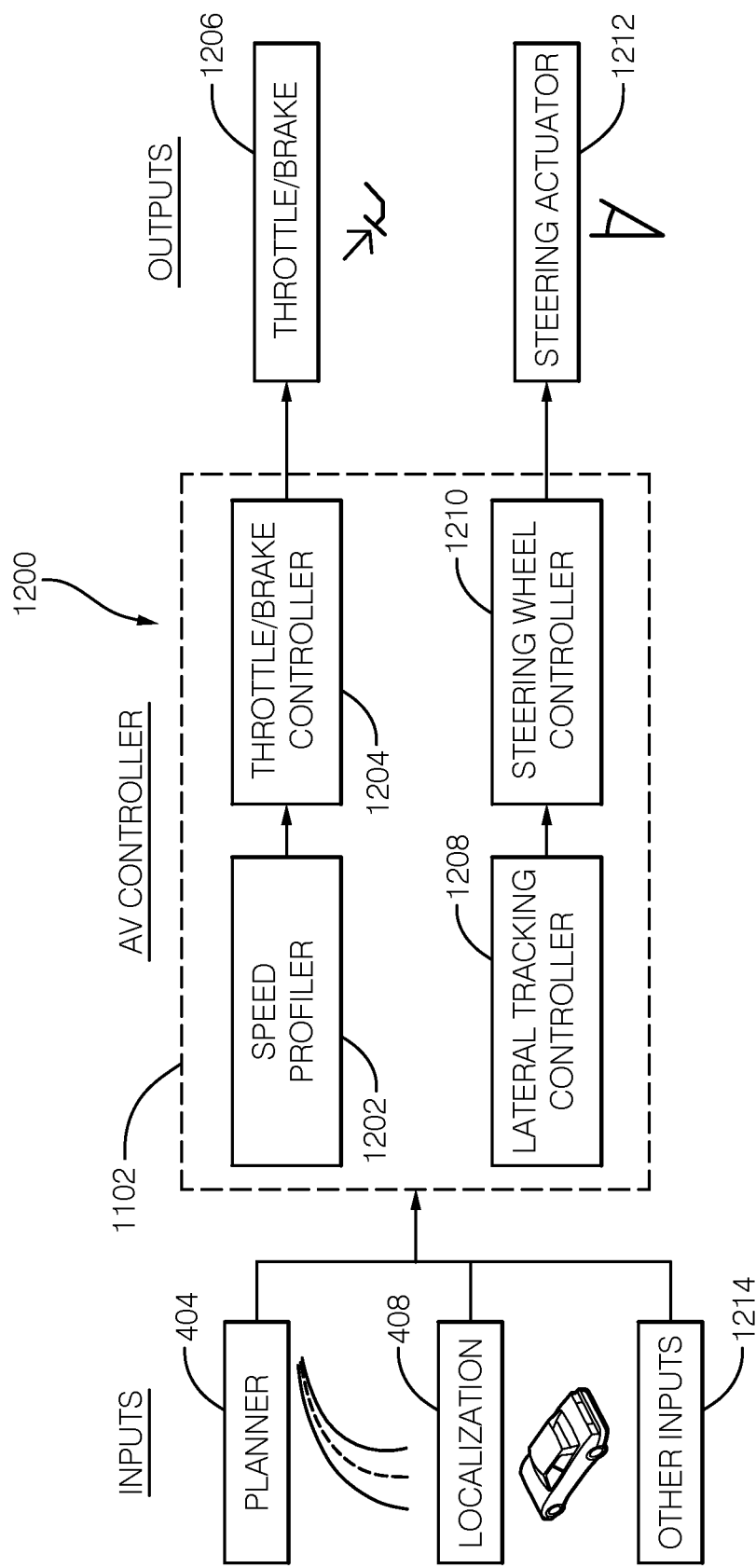
FIG. 12 shows a block diagram of the inputs, outputs, and components of a controller, in accordance with one or more embodiments.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Offline Camera-To-LiDAR Calibration

Figure 13A:
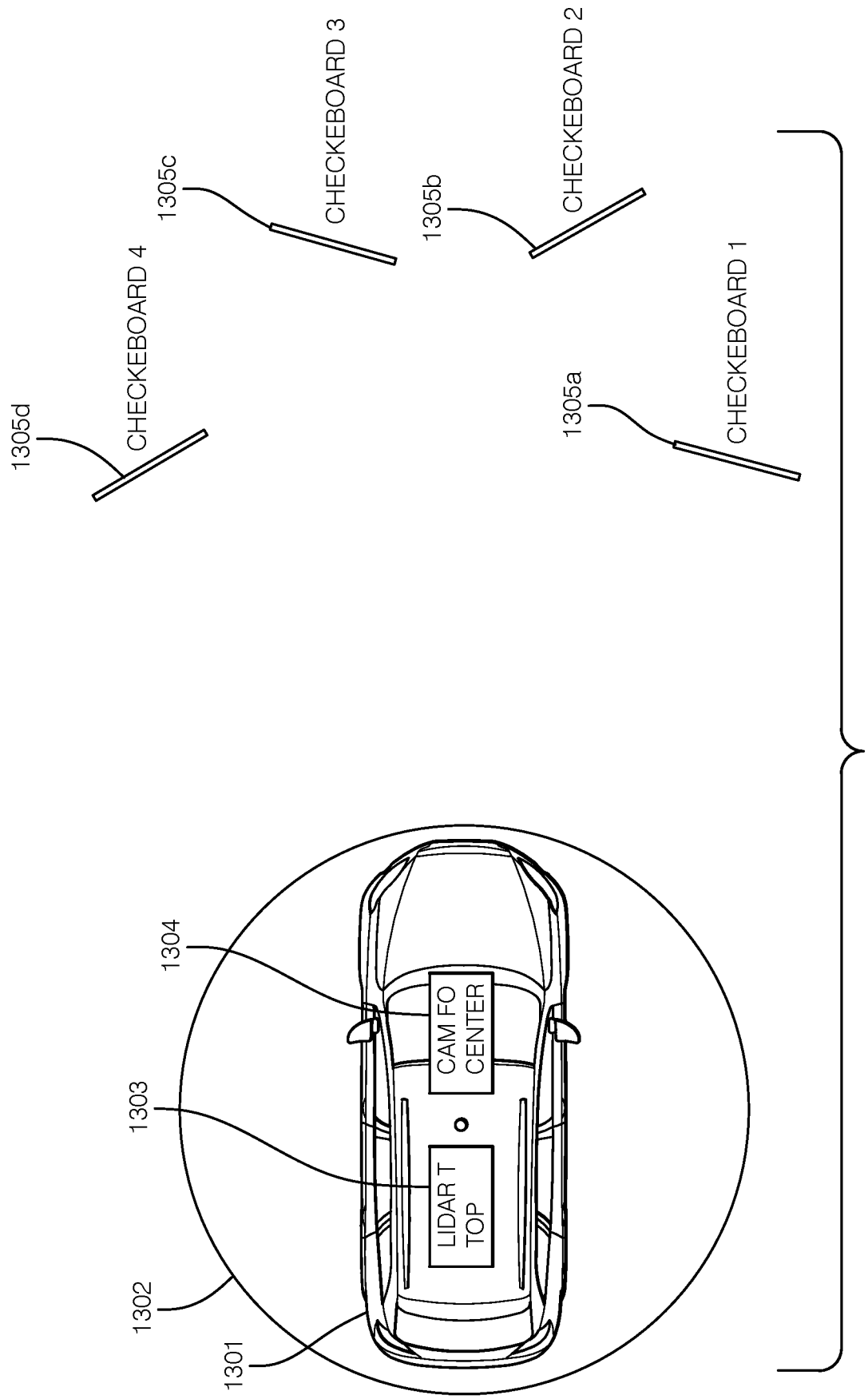
FIGS. 13A and 13B illustrate an offline sensor calibration system, in accordance with one or more embodiments.
Figure 13B:
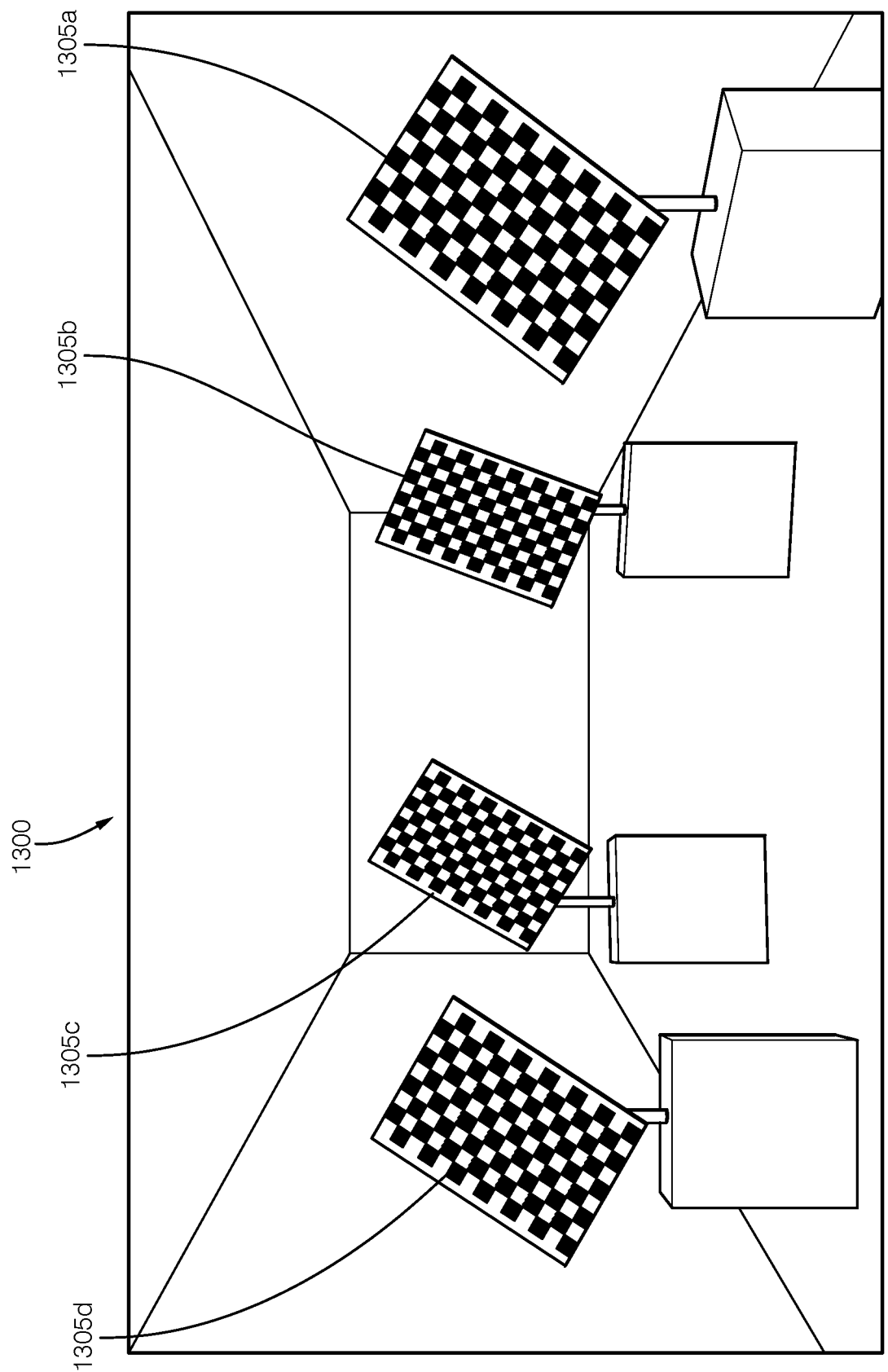

FIGS. 13A and 13B illustrate an offline sensor calibration system 1300, in accordance with one or more embodiments. Referring to FIG. 13A, system 1300 includes vehicle 1301 mounted on turn-table 1302 and a plurality of calibration targets 1305$a$ . . . 1305$d$. The vehicle 1301 can be, for example, an AV. Mounted on the vehicle 1301 rooftop is a 3D LiDAR sensor 1303 and a forward looking camera sensor 1304. Although two sensors are shown in this example, the vehicle 1301 can have any number and type of sensors. For example, there may be one or more back-facing and/or side-facing camera sensors mounted on the vehicle 1301. As will be described herein, those additional camera sensors will be calibrated and validated by rotating the turn table 1302 so that the boresights of those camera sensors are facing the calibration targets 1305$a$ . . . 1305$d$. In an embodiment, the system 300 can be housed in a maintenance station for AVs and/or included in an AV manufacturing facility.

Although four calibration targets are shown in this example that are different distances from the vehicle 1301 and have different poses, any number of calibration targets can be used and placed at any desirable pose angle and distance, provided the calibration targets can be simultaneously detected by the camera and LiDAR. In the examples that follow, the calibration targets 1305$a$ . . . 1305$d$ are checkerboards, as shown in FIG. 13B. However, those with ordinary skill in the art will understand that other planar calibration targets can be used. For example, besides a checkerboard pattern, a grid of circles or a noise-like pattern with many features of varying scales can be used as planar calibration targets.

Checkerboards are commonly used to perform the extrinsic calibration of various cameras and LiDAR range sensors because they provide numerous geometrical constraints and are easily detected by both sensors. Traditionally, checkerboard plane parameters are estimated in both the camera and LiDAR data. By establishing a plane-to-plane correspondence between the checkerboard observed by each sensor, the coordinate transformation between the LiDAR and camera is derived. This derivation requires a checkerboard to be captured in at least three different poses, as each pose constrains the transformation by two degrees of freedom (2-DOF). Typically, the calculation of the transformation matrix is decoupled into an initial derivation of the rotation matrix/vector and the translation vector. After separately solving for the rotation matrix and the translation vector, the transformation is refined by jointly optimizing the point-to-plane distance between the camera and LiDAR frames. In an embodiment, a quaternion can be used to represent rotation.

The approach described above does not exploit all of the information given by a single checkerboard. In addition to estimating the checkerboard's plane parameters, the checkerboard's orthogonal boundary vectors can be derived in both the camera image and the LiDAR point cloud. The boundary vectors constrain the extrinsic transformation by 2-DOF. Furthermore, a three-dimensional (3D) point correspondence of the checkerboard's centroid between both sensors modalities generates three further constraints. The proposed calibration procedure described below leverages all of the mentioned constraints and thus a single checkerboard suffices for the computation of the extrinsic transformation matrix.

Figure 14:
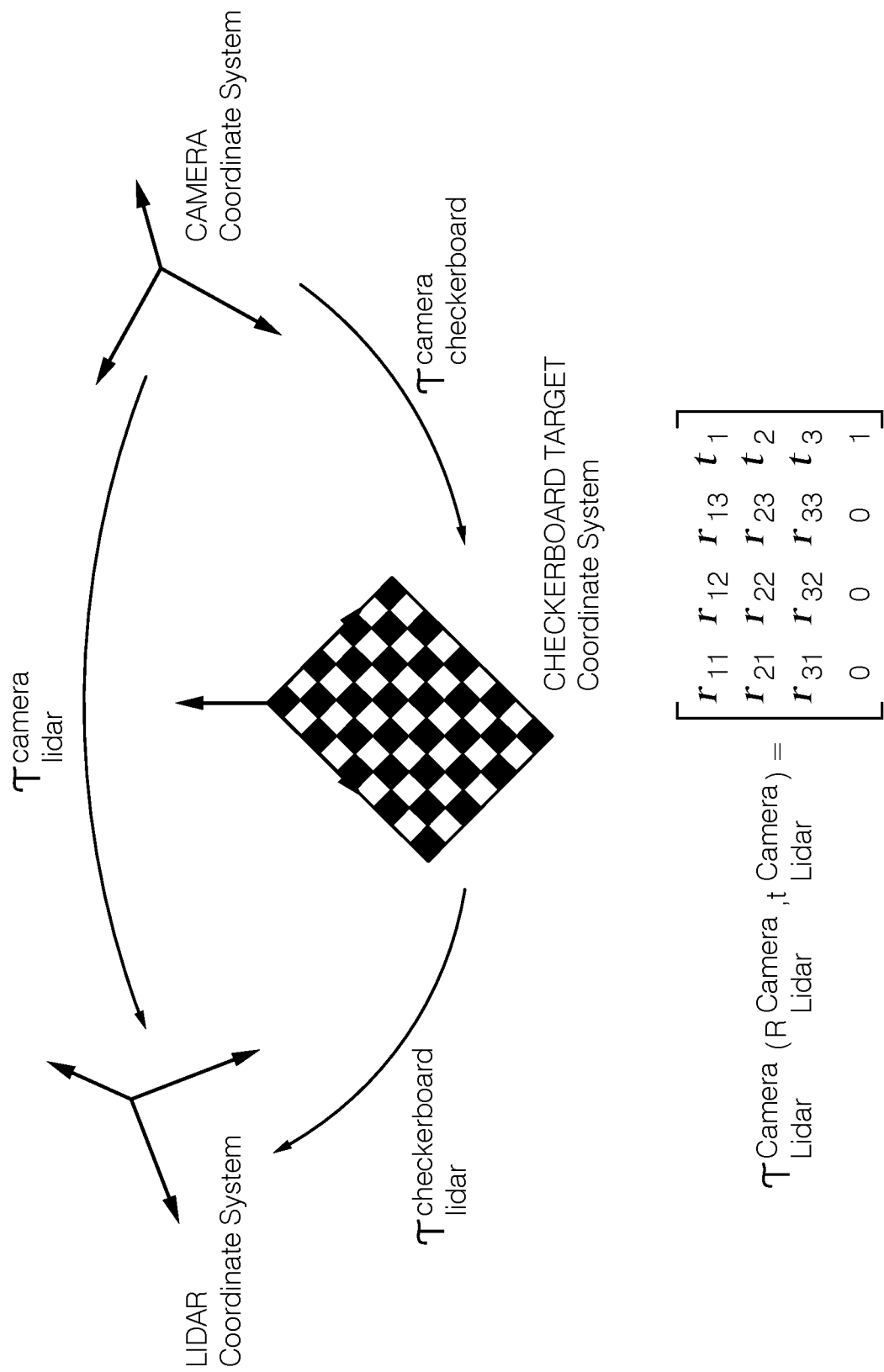
FIG. 14 illustrates the use of a checkerboard target to derive a LiDAR-to-camera transformation, in accordance with one or more embodiments.

FIG. 14 illustrates the use of a checkerboard to derive a camera-to-LiDAR coordinate transformation, in accordance with one or more embodiments. As shown, the calibration procedure uses three right-handed coordinate systems: a LiDAR coordinate system centered at the LiDAR location on the vehicle 1301, the camera coordinate system centered at the camera location on the vehicle 1301 and the checkboard coordinate system centered at a desired location on the checkerboard. The desired coordinate transformation is derived by determining the transformation from LiDAR coordinates to camera coordinates. The transformation from LiDAR-to-camera can be computed from the transformation from LiDAR to checkerboard and the transformation from checkerboard to camera using matrix multiplication as shown in Equation [1].

$$T_{LiDAR}^{Camera} = T_{LiDAR}^{Checkerboard} (T_{Camera}^{Checkerboard})^{-1}. \quad [1]$$

Also shown in FIG. 14 is the six degrees of freedom (6-DOF) transformation matrix parameters ("extrinsic parameters") that include a 3×3 rotation matrix $R_{LiDAR}^{Camera}$ and 3-component column vector $t_{LiDAR}^{Camera}$ for translation.

Figure 15:
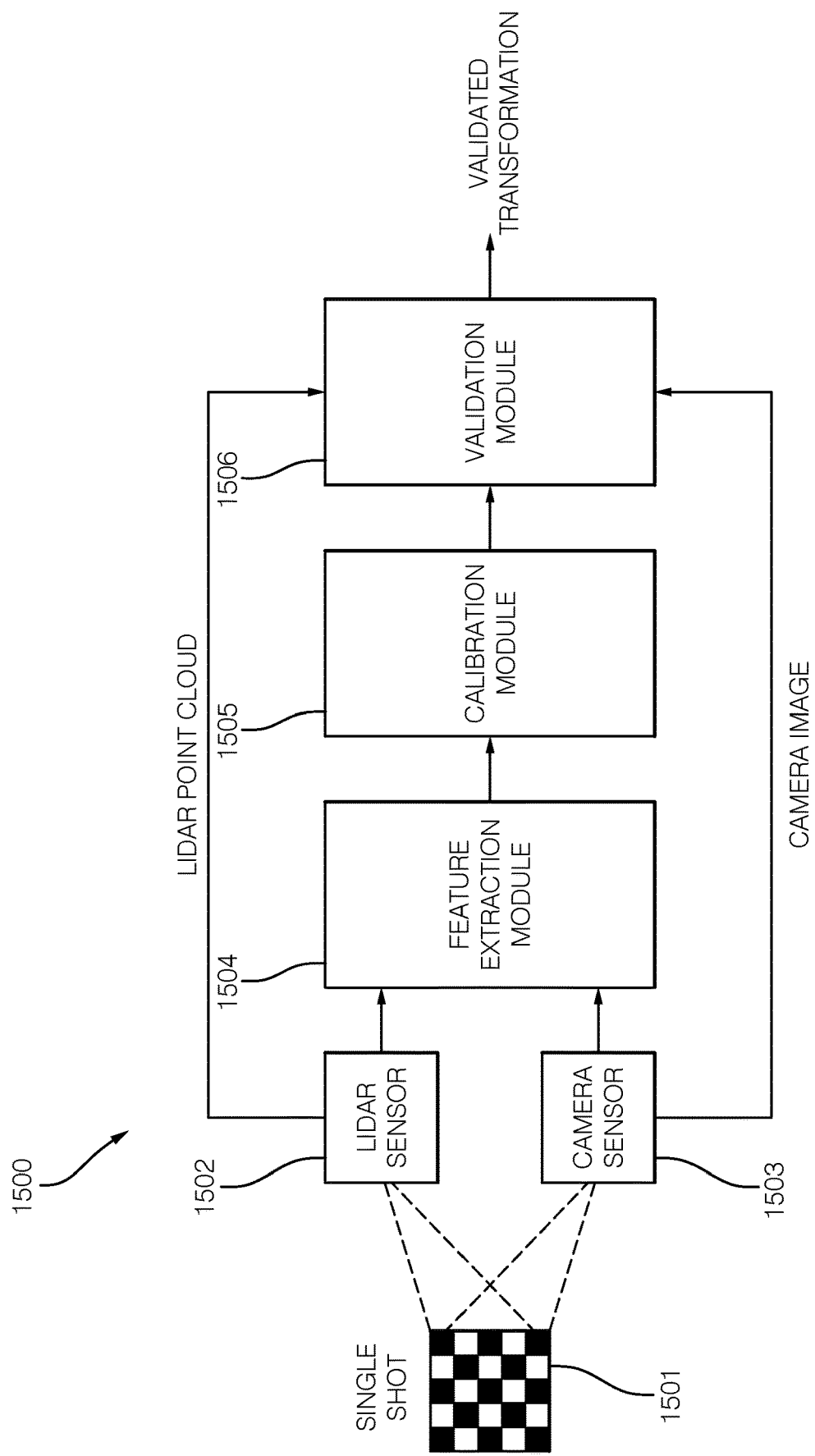
FIG. 15 is a block diagram of an extrinsic calibration and validation system, in accordance with one or more embodiments.

FIG. 15 is a block diagram of an extrinsic calibration and validation system 1500, in accordance with one or more embodiments. System 1500 includes LiDAR sensor 1502, camera sensor 1503, feature extraction module 1504, extrinsic calibration module 1505 and validation module 1506. Offline camera-to-LiDAR calibration and validation will now be described in reference to calibration and validation system 1500.

A. Problem Formulation

The underlying goal of an extrinsic calibration is to estimate the 6-DOF rigid-body transformation $T_L^C(R_L^C t_L^C)$ shown in FIG. 14 that describes the relative position, $t_L^C$, and the relative rotation, $R_L^C$, between the two sensors. By applying this transformation $T_L^C$, a point, $p_C$, in the camera coordinate system can be transformed into the LiDAR coordinate system $p_L = (T_L^C)^{-1} p_C$. We compute this transformation by extracting a common feature, a planar checkerboard, in both sensor modalities using feature extraction module 1504.

Figure 16:
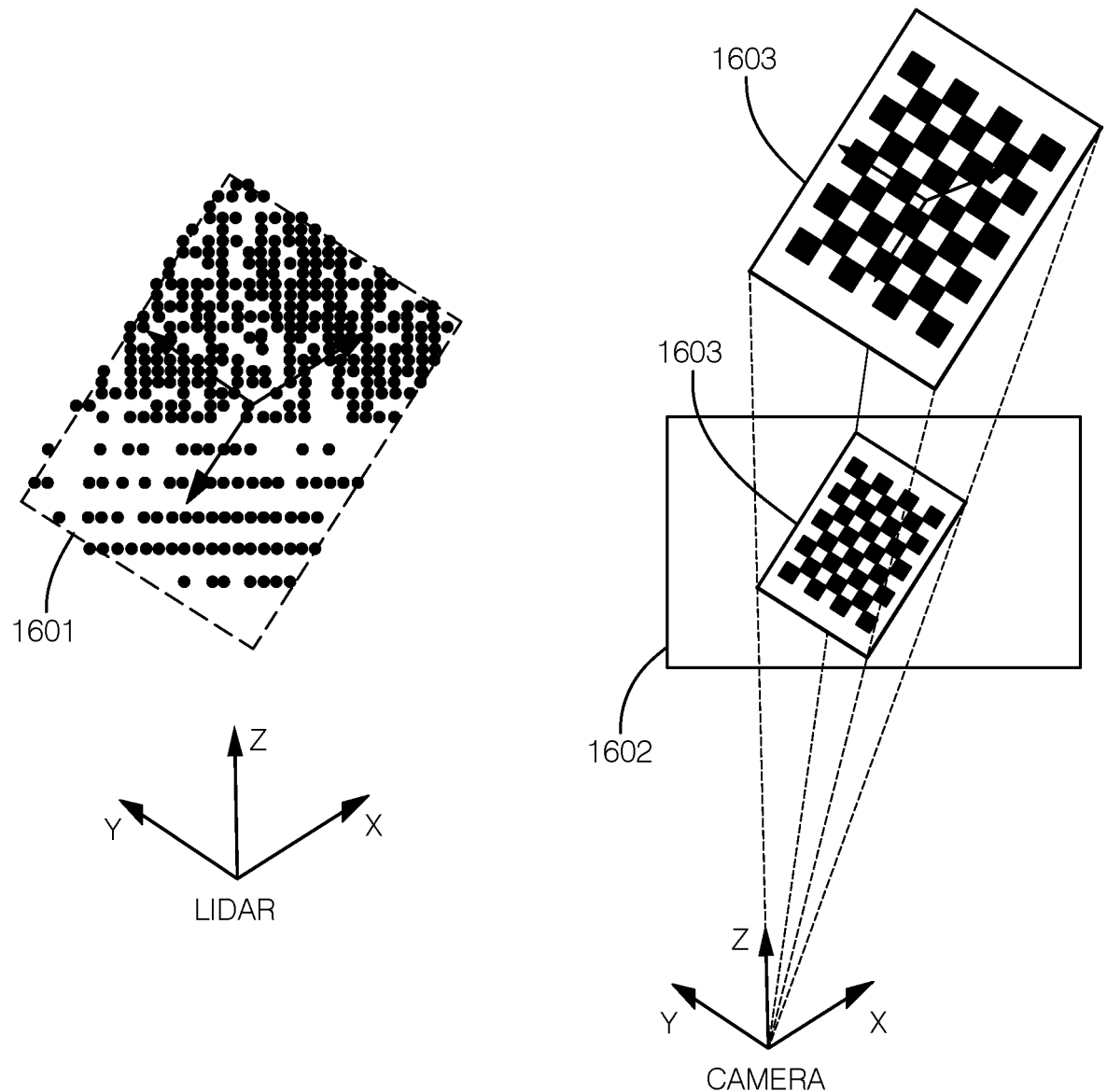
FIG. 16 illustrates how information is extracted from the i-th checkerboard pose in a LiDAR point cloud and camera image to yield the checkerboard's i-th unit normal vector, i-th unit boundary vector and i-th centroid, in accordance with one or more embodiments.

From a given checkerboard in the i-th pose observed in both the camera coordinate system C and in the LiDAR coordinate system, L, we deduce the checkerboard's plane vector, its boundary vectors and its centroid. These geometrical features are visualized in FIG. 16. In the camera frame of reference, let $n_C^i$ denote the i-th checkerboard's unit normal vector, $l_C^{ij}\{j=1, 2\}$ the checkerboard's unit boundary vectors, and $p_C^i$, the checkerboard's centroid. Similarly to the camera notation, let $n_L^i$ represent the checkerboard's unit normal vector and $I_L^{ij}\{j=1, 2\}$ the checkerboard's unit boundary vectors, and $P_L^i$ the checkerboard's centroid observed in the LiDAR coordinate system.

B. LiDAR Feature Extraction

Given N checkerboards, the segmentation algorithm automatically detects the previously introduced geometric features within a point cloud. By relying on the assumptions that the observed checkerboards are spatially separated from each other and the points corresponding to a checkerboard are tightly packed together, the point cloud is clustered into groups by applying the well-known clustering algorithm DBSCAN or any other suitable clustering algorithm. The points are then filtered within the DBSCAN clusters. All the points describing a single checkerboard should lie on a three-dimensional plane. Therefore, a plane is fit to each of the clusters using the well-known RANSAC algorithm. The points in the cluster are then refined, removing all of the points identified as outliers.

Next, the spatial clusters are filtered by their convex hull to recover the clusters containing the checkerboards themselves. The convex hull of the checkerboard clusters forms a rectangle of known dimensions. We assume the simplices of each cluster are formed by LiDAR returns marked by significant depth discontinuities. We refer to these points as "edge" points. A point classifies as an edge point if its depth value is significantly lower than at least one of its two nearest neighbors. When evaluating for edge points each beam is considered independently and therefore, only the nearest neighbors on the same beam are considered. The raw point cloud is filtered for all points exhibiting a depth discontinuity greater than ten centimeters. The depth discontinuity value for a point p is shown in Equation [2]:

$$x_p = \max(\rho_{p-1} - \rho_p, \rho_{p+1} - \rho_p, 0). \quad [2]$$

In Equation [2], p refers to radial distance (the L2 norm of the x and y components). The intersection between the detected edge points is computed. Each edge point is linked to the cluster containing the edge point itself.

Figure 17:
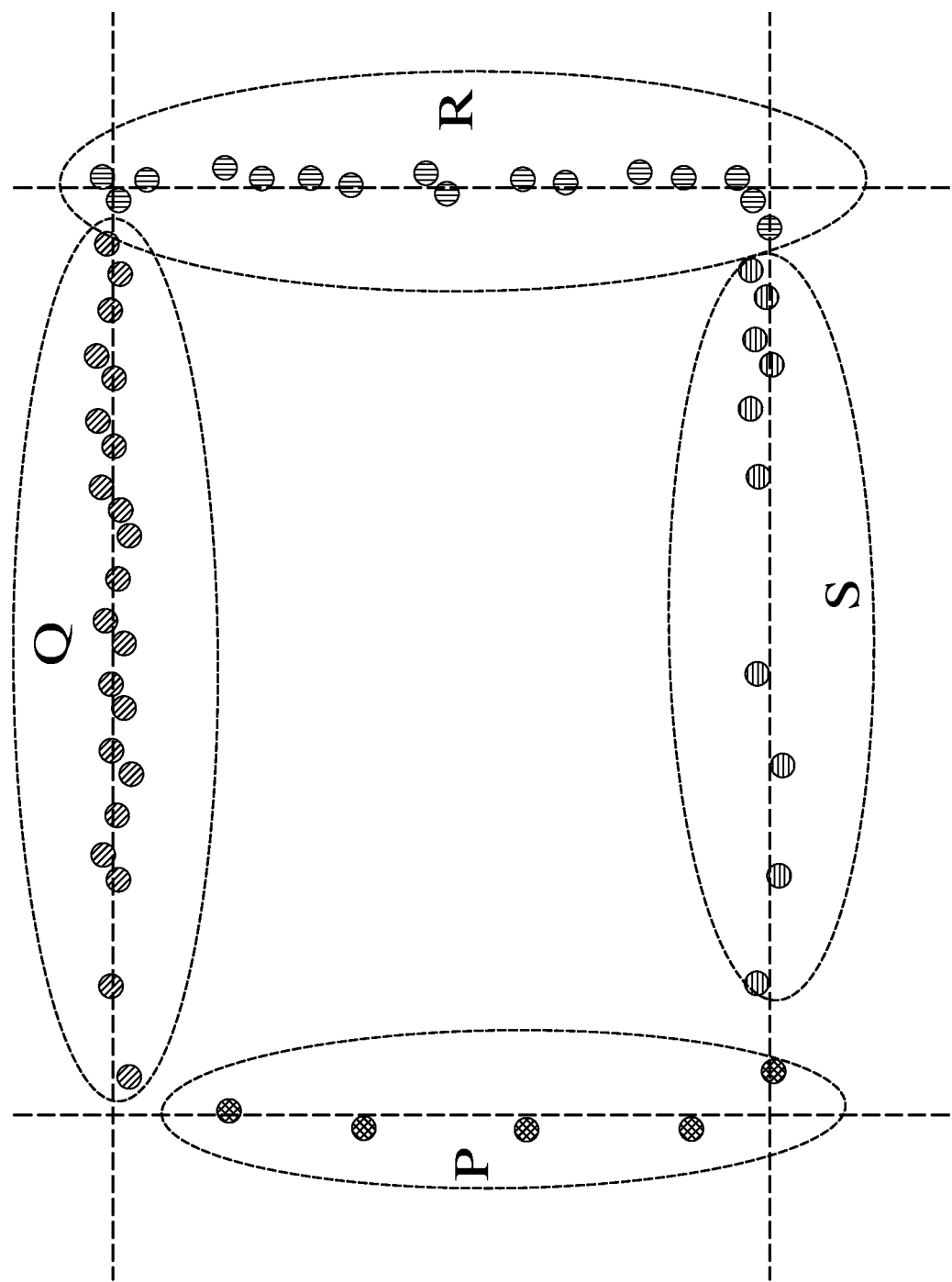
FIG. 17 illustrates LiDAR feature extraction where a cluster's edge points are projected onto the cluster's plane and fitted to a two-dimensional (2D) rectangle, in accordance with one or more embodiments.

In the last step, the cluster's edge points are projected onto the cluster's plane and fitted to a 2D rectangle. To reduce the fitting problem to two dimensions, a rotation is applied to align the z-axis with the plane vector. As LiDAR edge points are affected by noise, a constraint optimization problem is formulated, which incorporates priors on the geometrical shape of the rectangle, as well as on its dimensions. The processed edge points are then grouped into four sets: $P_i$, $i \in \{1, 2, \ldots, p\}$, $Q_j$, $j \in \{1, 2, \ldots, q\}$, $R_k$, $k \in \{1, 2, \ldots, r\}$, $S_l$, $l \in \{1, 2, \ldots, s\}$, where P, Q, R, S correspond to the four sides of the rectangle, as illustrated in FIG. 17. Since the sides of the rectangle are either parallel or orthogonal, the following four equations must be satisfied for each point on the boundary according to Equations [3a-3d]:

$$P: c_P + n_1 x P_i + n_2 y P_i = 0, \quad [3a]$$

$$Q: c_Q + n_2 x Q_j - n_1 y Q_j = 0, \quad [3b]$$

$$R: c_R + n_1 x R_k + n_2 y R_k = 0, \quad [3c]$$

$$S: c_s + n_2 x S_l - n_1 y P S_l = 0. \quad [3d]$$

This system of equations is constrained by the rectangle's length, width and magnitude of $[n_1, n_2]^T$:

$$\|c_P - c_R\|^2 = w^2, \|c_Q - c_S\|^2 = l^2, n_1^2 + n_2^2 = 1. \quad [4]$$

Let $x = [c_P, c_Q, c_R, c_S, n_1, n_2]^T$ be the solution to the following constrained, non-linear least squares problem:

$$\hat{x} = \min_x \|r\|^2 = \quad [5]$$

$$\min \sum_{k=0}^{p} \|c_P + n_1 x P_i + n_2 y P_i\|^2 + \ldots + \sum_{i=0}^{p} \|c_S + n_2 x S_l - n_1 y S_l\|^2 \text{ s.t}$$

The optimal solution to Equation [5] is obtained by adopting a sequential quadratic programming method. All clusters with a magnitude of $\|r\|^2$ below a threshold of 0.1 are regarded to be clusters containing a checkerboard, while all other clusters are ignored. This process is sufficient to separate the non-checkerboard clusters from the checkerboard clusters.

From the identified checker-board clusters, the checkerboard plane vector $n_L^i$ is derived, which equates to the previously fitted plane. The checkerboard boundary vectors $I_L^{ij}\{j=1, 2\}$ are computed by re-projecting the fitted rectangle parameters $[n_1, n_2]^T$ into the LiDAR coordinate frame. The centroid $P_L^i$ is defined as the average of the fitted rectangle's corner points.

Figures 18A, 18B:
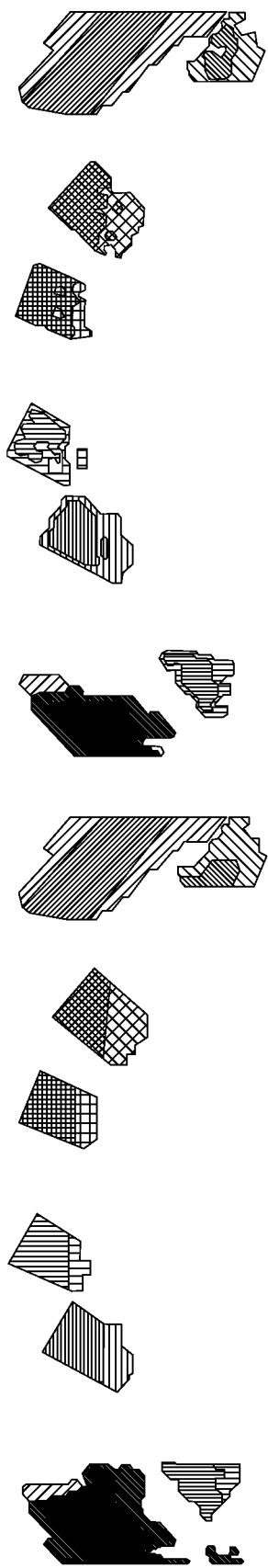
FIG. 18A illustrates identified clusters resulting from LiDAR feature segmentation/extraction, in accordance with one or more embodiments.
FIG. 18B illustrates filtered clusters resulting from LiDAR feature segmentation/extraction, in accordance with one or more embodiments.
Figures 18C, 18D:
FIG. 18C illustrates detected edge points resulting from LiDAR feature segmentation/extraction, in accordance with one or more embodiments.
FIG. 18D illustrates extracted checkerboard features resulting from LiDAR feature segmentation/extraction, in accordance with one or more embodiments.

Referring to FIGS. 18A-18D, an example LiDAR feature extraction process is summarized as follows. The point cloud is first clustered, then the clusters are filtered for points described by a 3D plane, and finally the checkerboard clusters are recovered by analyzing the convex hull formed by the cluster's edge points. FIG. 18A shows the identified clusters resulting from DBSCAN, FIG. 18B shows the clusters after filtering, FIG. 18C shows the detected edge points and FIG. 18D shows the extracted checkerboard features.

C. Camera Feature Extraction

The checkerboards are automatically detected in the camera image by using known computer vision algorithms defined within the publicly available OpenCV library. The three vectors associated with each checkerboard are extracted by solving the perspective-n-point (PnP) problem for each checkerboard, wherein solving the PnP problem includes estimating the pose of the camera given a set of 3D points in global coordinates and their corresponding 2D projections in the image. The camera pose consists of 6-DCF, which are made up of a rotation (roll, pitch, and yaw) and a 3D translation of the camera with respect to the global coordinates.

The solution to the PnP problem between the global and the pixel coordinates of each checkerboard corner is the transformation matrix that transforms the checkerboard's corner:

$$T_{Camera}^{Checkerboard} = (R_{Camera}^{Checkerboard}, t_{Camera}^{Checkerboard}).$$

This transformation matrix transforms the checkerboard's corner points from the checkerboard's coordinate system. Therefore, the column vectors of $R_{Camera}^{Checkerboard}$, $(I_C^{i1}, I_C^{i2}, n_C^i)$, equate to the three checkerboard vectors with respect to the camera coordinate system. The checkerboard's centroid $P_C^i$ is derived by expressing all of the checkerboard corner points with respect to the camera coordinate system. The centroid then equates to the average pose of all of the checkerboard corners in the camera coordinate system.

D. Extrinsic Calibration Algorithm

Referring again to FIG. 15, an extrinsic calibration algorithm is implemented by calibration module 1505. The transformation $T_L^C$ is defined by aligning the previously introduced checkerboard vector quantities in the LiDAR coordinate system with its counterparts in the camera coordinate system. Considering the vector correspondence between $n_C^i$ and $n_L^i$, the following constraints on the rotation matrix are obtained:

$$R_L^C n_C^i = n_L^i \ R_L^C I_C^{ij} = I_L^{ij}. \quad [6]$$

Given the point correspondence between $p_C^i$ and $p_L^i$, the translation vector $t_L^C$ is constrained by:

$$R_L^C p_C^i + t_L^C = p_L^i. \quad [7]$$

Given data from N checkboard poses, the rotation matrix $R_{LiDAR}^{Camera}$ is calculated from the constraints in Equation [6]. The introduction of the boundary vector correspondence significantly increases the diversity of the rotational measurements because $n_L^i$ is perpendicular to both $I_L^{ij}$. A linear least squares problem is formulated to reduce the impact of sensor noise:

$$\tilde{R}_L^C = \arg\min_{R_L^C} \sum_{i=1}^N \sum_{j=1}^2 \|R_L^C I_C^{ij} - I_L^{ij}\|^2 + \|R_L^C n_C^i - n_L^i\|^2. \quad [8a]$$

This optimization problem has a closed form solution. To formulate the closed form solution, the following column vector matrices are defined:

$$M_L = [I_L^{11}, I_L^{12}, n_L^1, \ldots, I_L^{N1} I_L^{N2} n_L^N], \quad [8b]$$

$$M_C = [I_C^{11}, I_C^{12}, n_C^1, \ldots, I_C^{N1} I_C^{N2} n_C^N]. \quad [8c]$$

Assuming that the singular value decomposition (SVD) of $M_L(M_C)^T = USV^T$, it follows that $\tilde{R}_L^C = VU^T$. This closed form solution can have degenerate solutions for which the $\tilde{R}_L^C$ is not a proper rotation matrix $\tilde{R}_L^C \in SO(3)$. To correct for degenerate solutions and thus ensure that all derived rotation matrices are $\tilde{R}_L^C \notin SO(3)$, a correction matrix $C = \text{diag}(1.0, 1.0, 1\text{-sign}(\det(VU^T))$ is introduced. Thus, the solution becomes $\tilde{R}_L^C = VCU^T$.

An estimate of the translation vector $t_L^C$ is derived by minimizing the point-to-point distances between the N checkerboard centroids. This minimization problem has a closed form solution if the translation is decoupled from the rotation. In the decoupled case, the translation estimate equates to:

$$\tilde{t}_L^C = \frac{\sum_{i=1}^N p_L^i - \tilde{R}_L^C \sum_{i=1}^N p_C^i}{N}. \quad [9]$$

An initial estimate of $\tilde{t}_L^C$ is computed using $\tilde{R}_L^C$. To avoid bias resulting from the non-uniform distribution of LiDAR points, the proposed algorithm solely relies on $p_C^i$ and $p_L^i$ to estimate the translation, instead of leveraging all of the checkerboard points.

In the previous sections, the initial transformation estimate was computed by treating the translation and the rotation separately. This estimate of the transformation is now refined by minimizing the following point-to-point distance of the N checkerboard center of masses jointly:

$$(\hat{R}_L^C, \hat{t}_L^C) = \arg\min_{R_L^C, t_L^C} \sum_{i=1}^N \|(R_L^C p_C^i + t_L^C) - p_L^i\|^2. \quad [10]$$

In an embodiment, Equation [10] is a nonlinear least squares problem that is solved using the Levenberg-Marquardt method or any other suitable non-linear solver.

Camera-To-LiDAR Validation

A. Problem Formulation

The goal of the validation procedure is not to define the exact miscalibration as the difference between the estimated extrinsic parameters $\hat{T}_L^C(\hat{\theta}_x, \hat{\theta}_y, \hat{\theta}_z, \hat{t}_x, \hat{t}_y, \hat{t}_z)$ and a ground-truth $T_L^C(\theta_x, \theta_y, \theta_z, t_x, t, t_z)$. The validation procedure computes an upper bound on the calibration's accuracy, which is possible without a ground-truth:

$$|\theta_i - \hat{\theta}_i| \le \varepsilon_i^\theta, |t_i - \hat{t}_i| \le \varepsilon_i^t, i \in \{x, y, z\}. \quad [11]$$

To estimate these upper bounds, the validation procedure takes as inputs the uncertainty associated with manually measured translation parameters $\varepsilon_t^{init}$ (e.g., +/−10 cm), and the dimensions and locations of the validation targets. In an embodiment, two validation targets, $V_1$ and $V_2$, are utilized whose shape and location is depicted in FIGS. 19A and 19B, respectively. We denote the closer target as $V_1$, which has the dimensions $h_1$, $l_1$, $w_1$ and is a distance $d_1$ away from the origin of the camera. Similarly, the more distant target $V_2$ dimensions are represented by $h_2$, $l_2$, $w_2$ and it is located $d_2$ away from the camera.

B. Validation Condition

We derive the upper bound on the calibration's accuracy as shown in Equation [12]:

$$K|\hat{T}_C^L|P_L \in I_C, \qquad [12]$$

where K is the camera matrix, $\hat{T}_C^L$ is the extrinsic transformation, $P_L=\{(x, y, z)\}$ are the LiDAR returns from the validation target and $IC=\{(u, v)\}$ are the pixels of the validation target. A range of parameters satisfies Equation [12], each projecting the LiDAR points, PL, onto the target pixels of the camera image, IC, in the image space, as illustrated in FIGS. 20A-20C, where FIG. 20A shows the LiDAR points, PL, corresponding to the frame, FIG. 20B shows the image, IC, of the frame as observed by the camera and FIG. 20C shows the projection of the LiDAR points onto the camera image, IC, with acceptable extrinsic calibration parameters. This range changes with the dimensions and location of the target.

Figure 21B:
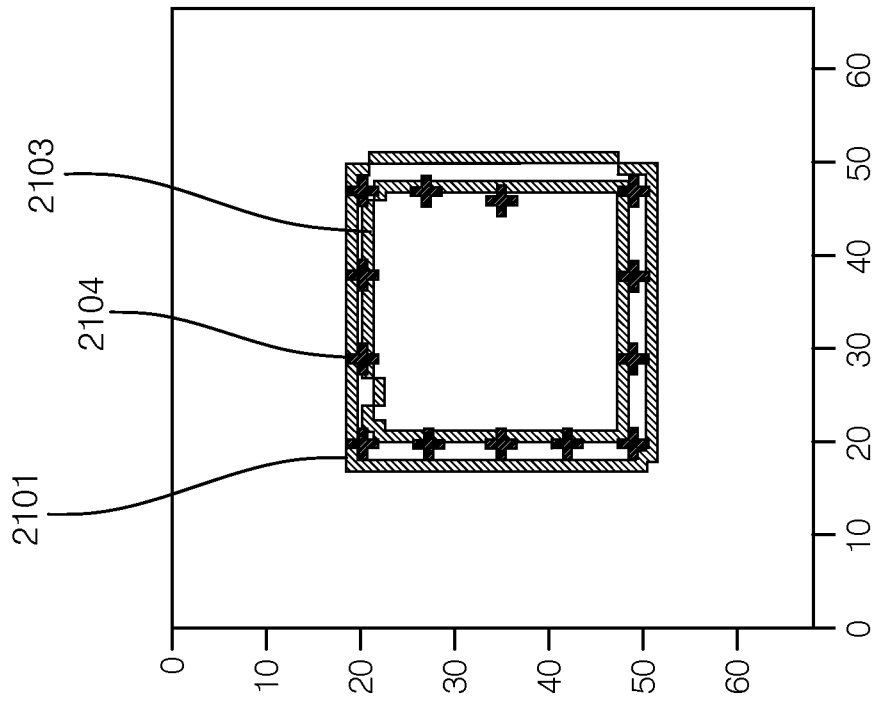
FIGS. 21A and 21B illustrate an initial error bound given by the frame increased by the yaw required to shift all of the LiDAR frame points onto the frame itself, in accordance with one or more embodiments.
Figure 21A:
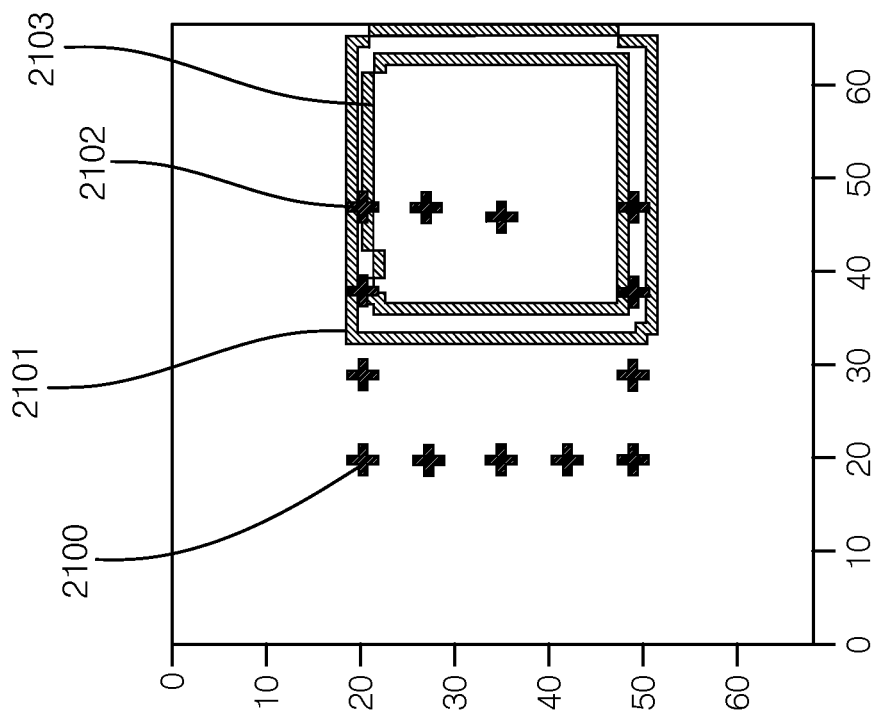

A calibration sufficing Equation[12] is visualized in FIGS. 21A and 21B where the "+" symbols are the projected LiDAR points. The initial error bound given by the frame (e.g. ±0.18 deg in yaw) is increased by the yaw required to shift all of the LiDAR frame points onto the frame itself (e.g. a 0.74 deg yaw shift is required and therefore the given calibration is accurate to ±0.92 deg).

C. Accuracy Bounds

Given a calibration that satisfies Equation [12] for two validation targets, $V_1$ and $V_2$, located at different ranges from the sensor suite, we exploit the closer target $V_1$ to bound the estimated translation parameters, while we recover the bounds on rotational parameters from the far target $V_2$. We start by defining the rotational bounds and then proceed to the translation bounds. An extrinsic transformation satisfying Equation [12] for $V_2$, could still deviate from the ground-truth by an error corresponding to at least the magnitude of $w_2$. In addition to an error of $w_2$, a translation error caused by an incorrect estimate of the translation vector could also be presented. To recover an upper bound on the rotational parameters, both sources of error are accounted for. The resulting upper bound for $i \in \{x, y\}$ is:

$$\varepsilon_\theta^i = \arctan\left(\frac{w_2}{2d_2}\right) + \arctan\left(\frac{\frac{w_2}{2} + \|\varepsilon_t^{init}\|}{d_2}\right). \qquad [13]$$

Now for the close frame $V_1$, we again consider the worst possible scenario: the presence of an error of the magnitude $w_1$ and an angular offset. The angular offset equates to the previously established bound shown in Equation [13]. We can then assert that the translation in the x-direction and y-direction is accurate to:

$$\varepsilon_t^i = d_1 \tan\left(\arctan\left(\frac{2w_1}{d_1}\right) + \varepsilon_\theta^i\right) - \|w_1\|. \qquad [14]$$

By iteratively solving Equations [13] and [14], the magnitude of the error upper bounds associated to the estimated calibration parameters are further reduced.

Finally, a bound on the accuracy of the calibrations roll $\theta_z$ are derived from the length and thickness of larger validation target:

$$\varepsilon_\theta^z = \max\left(\arctan\left(\frac{w_1}{l_1 - 2w_1}\right), \arctan\left(\frac{w_2}{l_2 - 2w_2}\right)\right). \qquad [15]$$

Assuming the second frame $F_2$ is planar and neglecting the influence of the perspective projection (plane of the frame is approximately parallel to the camera's image plane), a bound for the accuracy of the translation $t_z$ is computed by comparing the true frame dimensions with those measured in the camera image, which are denoted by L:

$$\varepsilon_t^z = f_x \max\left(\frac{l_1}{L_1 - 2W_1} - \frac{l_1}{L_1}, \frac{l_2}{L_2 - 2W_{W2}} - \frac{l_2}{L_2}\right). \qquad [16]$$

D. Implementation

By extracting $P_L$ from the point cloud and $I_c$ from the camera image automatically the validation procedure is automated. While $P_L$ is retrieved by clustering the edge points in the LiDAR data and filtering for clusters that could correspond to rectangles by using the rectangle fitting algorithm without the constraints on the rectangles dimensions, $I_C$ is detected through classical computer vision algorithms, such as contrast enhancement and edge detection.

Example Process

Figure 22A:
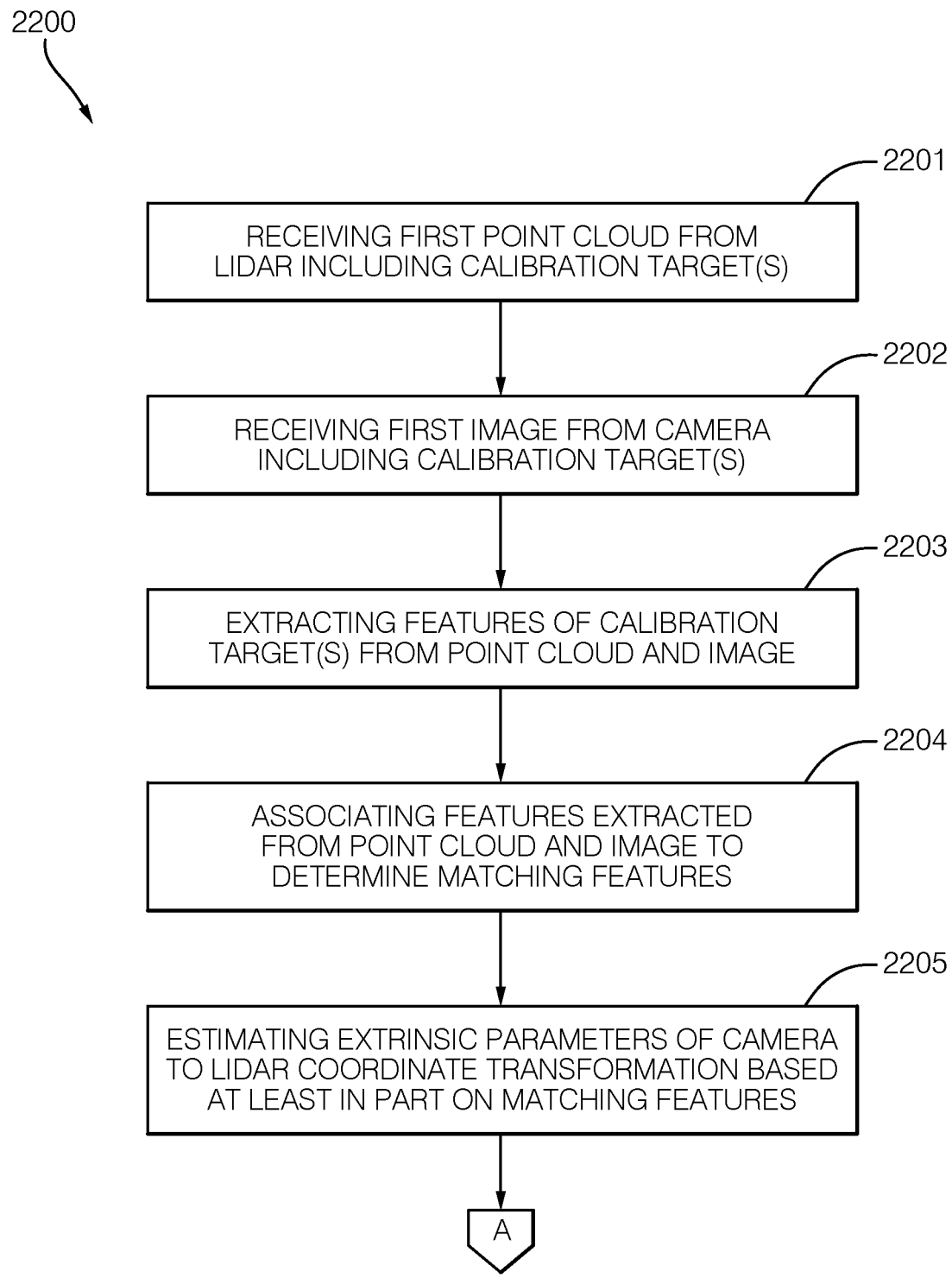
FIGS. 22A and 22B is a flow diagram of a process of calibrating and validating extrinsic parameters used in a coordinate transformation from camera-to-LiDAR, in accordance with one or more embodiments.
Figure 22B:
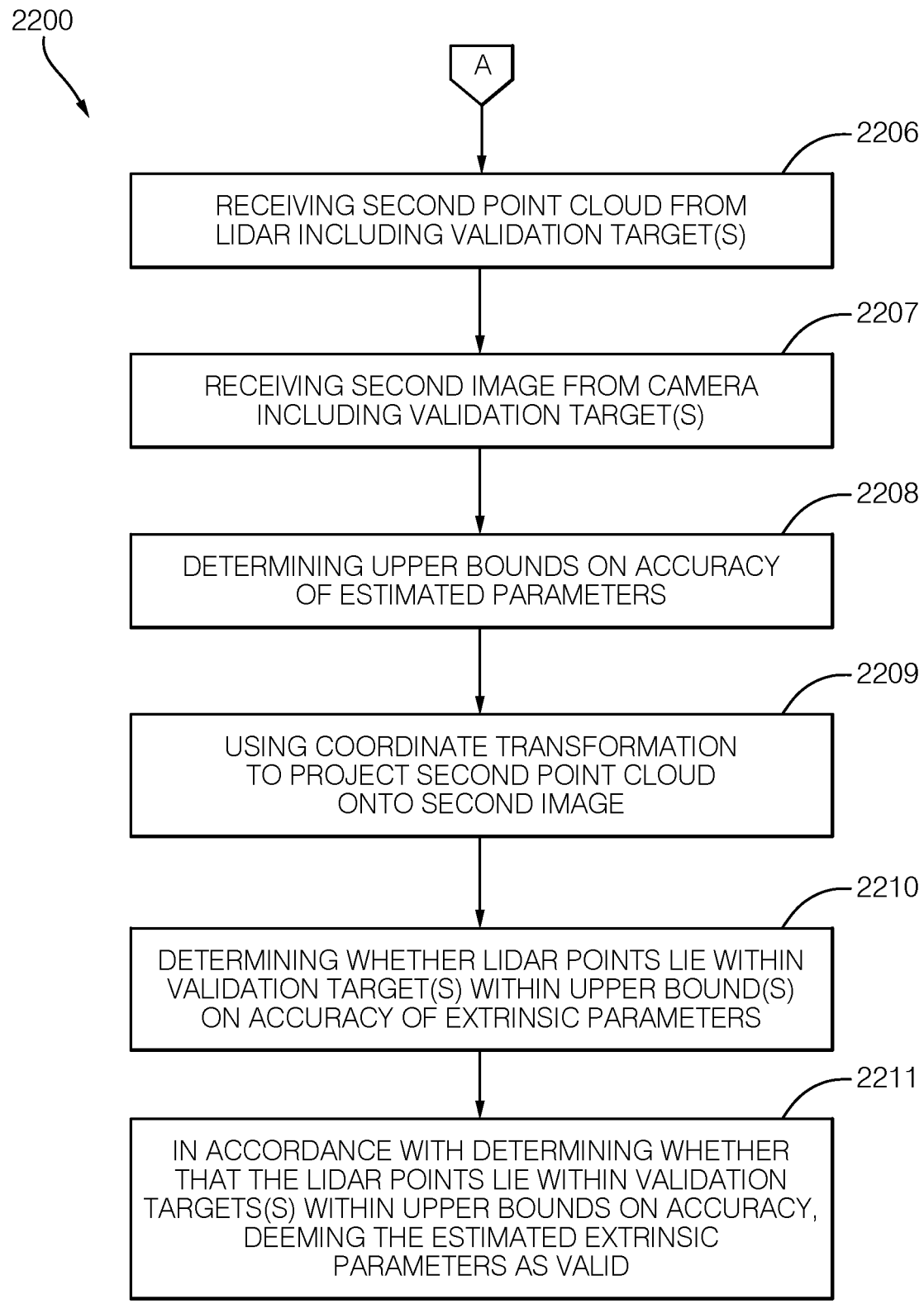

FIGS. 22A and 22B is a flow diagram of a process 2200 of calibrating and validating extrinsic parameters used in a camera-to-LiDAR coordinate transformation, in accordance with one or more embodiments. Process 2200 can be implemented using, for example, the computer system shown in FIG. 3. In an embodiment, spatial neural networks are used to predict the calibration parameters.

In an embodiment, process 2200 begins by receiving, from a light detection and ranging (LiDAR) sensor of a vehicle, a first point cloud including a first set of LiDAR points returned from one or more planar calibration targets (2202), and receiving, from a camera sensor of the vehicle, a first camera image including the one or more calibration targets. The calibration targets can be checkboard targets or any other suitable planar target.

Process 2200 continues by extracting, using one or more processors of the vehicle, features of the one or more calibration targets from the first set of LiDAR points and the first camera image (2203), associating the extracted features from the first set of LiDAR points and the first camera image to determine matching features (2204), and estimating extrinsic parameters of a coordinate transformation from LiDAR coordinates to camera coordinates or from camera coordinates to LiDAR coordinates based at least in part on the matching features (2205). For example, features are extracted from the LiDAR point cloud and camera image as described in reference to FIGS. 15-18.

Process 2200 continues by receiving, from the LiDAR sensor, a second point cloud including a second set of LiDAR points returned from one or more validation targets (2206) and receiving, from the camera sensor, a second camera image including the one or more validation targets (2207). For example, a second LiDAR scan and camera image are used to validate the estimated extrinsic parameters of the coordinate transformation from camera coordinates to LiDAR coordinates.

Process 2200 continues by using the coordinate transformation to project the second set of LiDAR points onto the one or more validation targets in the second camera image (2208), computing one or more upper bounds on the accuracy of the estimated extrinsic parameters (2209), determining whether a specified number or percentage of LiDAR points in the second set of LiDAR points lie on or within the one or more validation targets included in the second camera image in accordance with the computed one or more upper bounds on accuracy (2210). In accordance with the specified number or percentage of LiDAR points from the second set of LiDAR points lying on or within the one or more validation targets in the second camera image being within the upper bound on accuracy, the estimated extrinsic parameters of the coordinate transformation are deemed valid (2211). For example, the steps for validating the estimated extrinsic parameters are described in reference to FIGS. 19-21.

In the foregoing description, various embodiments have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

The invention claimed is:

1. A method comprising:
   receiving, from a light detection and ranging (LiDAR) sensor of a vehicle, a first point cloud including a first set of LiDAR points returned from one or more calibration targets;
   receiving, from a camera sensor of the vehicle, a first camera image including the one or more calibration targets;
   extracting, using one or more processors of the vehicle, features of the one or more calibration targets from the first set of LiDAR points and the first camera image;
   associating, using the one or more processors, the extracted features from the first set of LiDAR points and the first camera image to determine matching features;
   estimating, using the one or more processors, extrinsic parameters of a coordinate transformation from LiDAR coordinates to camera coordinates or from the camera coordinates to the LiDAR coordinates, based at least in part on the matching features;
   receiving, from the LiDAR sensor, a second point cloud including a second set of LiDAR points returned from one or more validation targets;
   receiving, from the camera sensor, a second camera image including the one or more validation targets;
   using the coordinate transformation to project the second set of LiDAR points onto the one or more validation targets in the second camera image;
   estimating, using the one or more processors, one or more upper bounds on accuracy of the estimated extrinsic parameters;
   determining, using the one or more processors, whether a specified number or percentage of LiDAR points in the second set of LiDAR points lie on or within the one or more validation targets included in the second camera image in accordance with the estimated one or more upper bounds on accuracy; and
   in accordance with the specified number or percentage of LiDAR points from the second set of LiDAR points lying on or within the one or more validation targets in the second camera image within the one or more upper bounds on accuracy, deeming the estimated extrinsic parameters of the coordinate transformation valid.

2. The method of claim 1, wherein the extracted features include vector quantities defining a plane of the one or more calibration targets, and the extrinsic parameters are estimated by aligning the vector quantities in the LiDAR coordinates with their counterpart vector quantities in the camera coordinates, and wherein the vector quantities match when the vector quantities correspond within defined constraints on rotation and translation of the vector quantities.

3. The method of claim 1, wherein estimating the one or more upper bounds on accuracy accounts for uncertainty associated with manually measured translation parameters and dimensions and locations of the one or more validation targets.

4. The method of claim 1, wherein two validation targets are used and a first validation target is a first distance from the camera sensor and a second validation target is a second distance from the camera senosr that is farther than the first distance, and where the first validation target is used to estimate a first upper bound on accuracy for estimated translation parameters included in the estimated extrinsic parameters, and the second validation target is used to estimate a second upper bound on estimated rotational parameters included in the estimated extrinsic parameters.

5. The method of claim 3, wherein an upper bound on an estimated roll angle of the estimated extrinsic parameters is derived from a length and thickness of a larger of the two validation targets.

6. The method of claim 1, wherein extracting, using the one or more processors of the vehicle, features of the one or more calibration targets from the first set of LiDAR points, further comprises:
   clustering the first set of LiDAR points into spatial clusters of LiDAR points;
   for each cluster:
      filter the LiDAR points within the cluster to detect outlier LiDAR points;
      refine the cluster by removing any detected outlier LiDAR points from the cluster;
      filter the cluster by its convex hull, where the convex hull forms a rectangle of known dimensions;
      detect edge points in the cluster;
      project the edge points onto a plane of the cluster;
      fit a two-dimensional (2D) rectangle to the edge points;
      determine whether the fitted 2D rectangle defines a calibration target by formulating and solving a constraint optimization problem, which incorporates priors on the 2D rectangle's geometrical shape and dimensions; and in accordance with the fitted 2D rectangle defining the calibration target, deriving a plane vector, boundary vectors and a centroid of the 2D rectangle as the features of the calibration target.

7. The method of claim 6, wherein detecting the edge points in the cluster includes filtering the first point cloud for points exhibiting a depth continuity greater than a threshold value, identifying filtered points on a beam that have depth values that are lower than at least one of two nearest neighbor LiDAR points on the same beam, computing an intersection between the detected edge points, and linking each edge point to the cluster containing the edge point.

8. The method of claim 1, wherein extracting, using the one or more processors of the vehicle, features of the one or more calibration targets from the first camera image, further comprises:
    detecting , using a computer vision process, the one or more calibration targets in the first camera image; and
    extracting three calibration target vectors from the detected calibration targets by solving a perspective-n-point (PnP) problem for each calibration target, where a solution to the PnP problem between global and pixel coordinates of each corner of each calibration target is a transformation from the camera coordinates to calibration target coordinates, which transforms the corner from a calibration target coordinate system to a camera coordinate system, and where column vectors of the transformation equate to the three calibration target vectors with respect to the camera coordinate system, wherein each centroid of a calibration target is derived by expressing all of the corner points of each calibration target with respect to the camera coordinate system, and wherein the centroid equates to an average pose of all of the corners in the camera coordinate system.

9. The method of claim 8, further comprising filtering the first point cloud for points exhibiting a depth continuity greater than a threshold value.

10. The method of claim 1, wherein the one or more calibration targets are planar checkerboards.

11. A system comprising:
one or more processors; and
memory storing instructions that when executed by the one or more processors, cause the one or more processors to perform operations comprising:
    receiving, from a light detection and ranging (LiDAR) sensor of a vehicle, a first point cloud including a first set of LiDAR points returned from one or more calibration targets;
    receiving, from a camera sensor of the vehicle, a first camera image including the one or more calibration targets;
    extracting, using the one or more processors of the vehicle, features of the one or more calibration targets from the first set of LiDAR points and the first camera image;
    associating, using the one or more processors, the extracted features from the first set of LiDAR points and the first camera image to determine matching features;
    estimating, using the one or more processors, extrinsic parameters of a coordinate transformation from LiDAR coordinates to camera coordinates or from the camera coordinates to the LiDAR coordinates, based at least in part on the matching features;
    receiving, from the LiDAR sensor, a second point cloud including a second set of LiDAR points returned from one or more validation targets;
    receiving, from the camera sensor, a second camera image including the one or more validation targets;
    using the coordinate transformation to project the second set of LiDAR points onto the one or more validation targets in the second camera image;
    estimating, using the one or more processors, one or more upper bounds on accuracy of the estimated extrinsic parameters;
    determining, using the one or more processors, whether a specified number or percentage of LiDAR points in the second set of LiDAR points lie on or within the one or more validation targets included in the second camera image in accordance with the estimated one or more upper bounds on accuracy; and
    in accordance with the specified number or percentage of LiDAR points from the second set of LiDAR points lying on or within the one or more validation targets in the second camera image within the one or more upper bounds on accuracy, deeming the estimated extrinsic parameters of the coordinate transformation valid.

12. The system of claim 11, wherein the extracted features include vector quantities defining a plane of the one or more calibration targets, and the extrinsic parameters are estimated by aligning the vector quantities in the LiDAR coordinates with their counterpart vector quantities in the camera coordinates, and wherein the vector quantities match when the vector quantities correspond within defined constraints on rotation and translation of the vector quantities.

13. The system of claim 11, wherein estimating the one or more upper bounds on accuracy accounts for uncertainty associated with manually measured translation parameters and dimensions and locations of the one or more validation targets.

14. The system of claim 11, wherein two validation targets are used and a first validation target is a first distance from the camera sensor and a second validation target is a second distance from the camera sensor that is farther than the first distance, and where the first validation target is used to estimate a first upper bound on accuracy for estimated translation parameters included in the estimated extrinsic parameters, and the second validation target is used to estimate a second upper bound on estimated rotational parameters included in the estimated extrinsic parameters.

15. The system of claim 13, wherein an upper bound on an estimated roll angle of the estimated extrinsic parameters is derived from a length and thickness of a larger of the two validation targets.

16. The system of claim 11, wherein extracting, using the one or more processors of the vehicle, features of the one or more calibration targets from the first set of LiDAR points, further comprises:
    clustering the first set of LiDAR points into spatial clusters of LiDAR points;
    for each cluster:
        filter the LiDAR points within the cluster to detect outlier LiDAR points;
        refine the cluster by removing any detected outlier LiDAR points from the cluster;
        filter the cluster by its convex hull, where the convex hull forms a rectangle of known dimensions;
        detect edge points in the cluster;
        project the edge points onto a plane of the cluster;
        fit a two-dimensional (2D) rectangle to the edge points;

determine whether the fitted 2D rectangle defines a calibration target by formulating and solving a constraint optimization problem, which incorporates priors on the 2D rectangle's geometrical shape and dimensions; and in accordance with the fitted 2D rectangle defining the calibration target, deriving a plane vector, boundary vectors and a centroid of the 2D rectangle as the features of the calibration target.

17. The system of claim 16, wherein detecting the edge points in the cluster includes filtering the first point cloud for points exhibiting a depth continuity greater than a threshold value, identifying filtered points on a beam that have depth values that are lower than at least one of two nearest neighbor LiDAR points on the same beam, computing an intersection between the detected edge points, and linking each edge point to the cluster containing the edge point.

18. The system of claim 11, wherein extracting, using the one or more processors of the vehicle, features of the one or more calibration targets from the first camera image, further comprises:

detecting, using a computer vision process, the one or more calibration targets in the first camera image; and extracting three calibration target vectors from the detected calibration targets by solving a perspective-n-point (PnP) problem for each calibration target, where a solution to the PnP problem between global and pixel coordinates of each corner of each calibration target is a transformation from the camera coordinates to calibration target coordinates, which transforms the corner from a calibration target coordinate system to a camera coordinate system, and where column vectors of the transformation equate to the three calibration target vectors with respect to the camera coordinate system, wherein each centroid of a calibration target is derived by expressing all of the corner points of each calibration target with respect to the camera coordinate system, and wherein the centroid equates to an average pose of all of the corners in the camera coordinate system.

19. The system of claim 18, further comprising filtering the first point cloud for points exhibiting a depth continuity greater than a threshold value.

20. The system of claim 11, wherein the one or more calibration targets are planar checkerboards.

21. A non-transitory computer program product storing instructions that, when executed by at least one programmable processor, cause the at least one programmable processor to perform operations comprising:

receiving, from a light detection and ranging (LiDAR) sensor of a vehicle, a first point cloud including a first set of LiDAR points returned from one or more calibration targets;

receiving, from a camera sensor of the vehicle, a first camera image including the one or more calibration targets;

extracting, using one or more processors of the vehicle, features of the one or more calibration targets from the first set of LiDAR points and the first camera image;

associating, using the one or more processors, the extracted features from the first set of LiDAR points and the first camera image to determine matching features;

estimating, using the one or more processors, extrinsic parameters of a coordinate transformation from LiDAR coordinates to camera coordinates or from the camera coordinates to the LiDAR coordinates, based at least in part on the matching features;

receiving, from the LiDAR sensor, a second point cloud including a second set of LiDAR points returned from one or more validation targets;

receiving, from the camera sensor, a second camera image including the one or more validation targets;

using the coordinate transformation to project the second set of LiDAR points onto the one or more validation targets in the second camera image;

estimating, using the one or more processors, one or more upper bounds on accuracy of the estimated extrinsic parameters;

determining, using the one or more processors, whether a specified number or percentage of LiDAR points in the second set of LiDAR points lie on or within the one or more validation targets included in the second camera image in accordance with the estimated one or more upper bounds on accuracy; and in accordance with the specified number or percentage of LiDAR points from the second set of LiDAR points lying on or within the one or more validation targets in the second camera image within the one or more upper bounds on accuracy, deeming the estimated extrinsic parameters of the coordinate transformation valid.

* * * * *

UNITED STATES PATENT AND TRADEMARK OFFICE
CERTIFICATE OF CORRECTION

| | | |
|---|---|---|
| PATENT NO. | : 11,940,539 B2 | Page 1 of 1 |
| APPLICATION NO. | : 17/124468 | |
| DATED | : March 26, 2024 | |
| INVENTOR(S) | : Paul Aurel Diederichs et al. | |

It is certified that error appears in the above-identified patent and that said Letters Patent is hereby corrected as shown below:

In the Claims

Column 28, Line 36, In Claim 4, delete "senosr" and insert -- sensor --;

Column 29, Line 18, In Claim 8, delete "detecting ," and insert -- detecting, --;

Column 31, Line 22, In Claim 18, delete "detecting ," and insert -- detecting, --.

Signed and Sealed this
Fourteenth Day of May, 2024

Katherine Kelly Vidal
*Director of the United States Patent and Trademark Office*